US012684184B2

(12) United States Patent (10) Patent No.: US 12,684,184 B2
Doken et al. (45) Date of Patent: Jul. 14, 2026

(54) METHODS AND SYSTEMS FOR DELIVERING CONTENT TO A CLIENT DEVICE

(71) Applicant: Adeia Guides Inc., San Jose, CA (US)

(72) Inventors: Serhad Doken, Bryn Mawr, PA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 83 days.

(21) Appl. No.: 18/901,336

(22) Filed: Sep. 30, 2024

(65) Prior Publication Data

US 2026/0095607 A1     Apr. 2, 2026

(51) Int. Cl.
H04N 21/25 (2011.01)
H04N 21/414 (2011.01)
H04N 21/478 (2011.01)

(52) U.S. Cl.
CPC ....... H04N 21/25 (2013.01); H04N 21/41407 (2013.01); H04N 21/478 (2013.01)

(58) Field of Classification Search
CPC . H04N 21/25; H04N 21/41407; H04N 21/478
See application file for complete search history.

(56) References Cited

U.S. PATENT DOCUMENTS

2006/0240808 A1    10/2006    Crolley
2010/0299274 A1    11/2010    Rappaport

2022/0342733 A1*    10/2022    Nair ......................... H04L 67/10
2023/0308983 A1*    9/2023    Saito ...................... H04W 40/18
2025/0158937 A1*    5/2025    Echevarria ............ H04L 47/783

FOREIGN PATENT DOCUMENTS

WO          2016/123497 A1        8/2016

OTHER PUBLICATIONS

"Have a story you want us to cover? A product unboxing or review? A social media takeover?", available online at: <https://www.rideplay.tv/media>, Oct. 2024, 2 pages.
Alfi, "Elevate your rider's experience, get a free tablet now", available online at: <https://drivers.getalfi.com/>, 2023. 5 pages.

(Continued)

*Primary Examiner* — Kyu Chae
(74) *Attorney, Agent, or Firm* — HG LAW LLP

(57) ABSTRACT

Systems and methods are described for delivering content to a mobile client device. Journey data is determined, indicating a path to be travelled by the client device. Edge servers are identified based on the journey data, each configured to deliver content to the client device as the client device travels along the path and is located within a local range thereof. An upcoming movement into a local range of a first edge server is predicted based on the journey data. Content to be delivered to the client device is determined, the content associated with the local range of the first edge server. Storage of the content at a second edge server, before the first edge server along the path, is caused. The content is delivered by the second edge server to the client device while the client device is within a local range of the second edge server.

20 Claims, 10 Drawing Sheets

(56) References Cited

OTHER PUBLICATIONS

Ashraf, C., "Verizon Business brings private MEC to enterprise customers with AWS", available online at: <https://www.verizon.com/about/news/verizon-business-private-mec-aws>, May 4, 2021, 6 pages.

AWS, "AWS for the Edge Bring the world's most capable and secure cloud to you", available online at: <https://aws.amazon.com/edge/>, retrieved on Dec. 5, 2024 9 pages.

Bell, "Seize new opportunities with Bell Public MEC", available online at: <https://business.bell.ca/shop/medium-large/cloud/public-mec-with-aws-wavelength>, retrieved on Dec. 5, 2024, 5 pages.

Casey, K., "The case for public mobile edge computing (MEC)", Verizon business, retrieved on <https://www.verizon.com/business/resources/articles/s/the-case-for-public-mobile-edge-computing/>, Dec. 5, 2024, 3 pages.

Evans, S., "Uber and Lyft Rides Could Soon Get a Lot More Entertaining", available online at: <https://www.motortrend.com/news/ivee-rideshare-infotainment-uber-lyft/>, Mar. 28, 2022, 11 pages.

Hercher, J., "T-Mobile Acquires Octopus Interactive and Says It's Still Committed to Ad Tech", available online at: <https://www.adexchanger.com/mobile/t-mobile-acquires-octopus-interactive-and-says-its-still-committed-to-ad-tech/#:%7E:text=On%20Monday%2C%20T%2DMobile%20Marketing,content%20and%2C%20of%20course%2C%20see>, Jan. 10, 2022, 7 pages.

Lyft Media, "Transportation Advertising, Redefined.", available online at: < https://media.lyft.com/>, retrieved on Dec. 5, 2024, 4 pages.

OAG, "Maximizing Travel Ad Spend: Leveraging Aviation Data for Strategic Allocation", available online at: <https://www.oag.com/blog/maximizing-travel-ad-spend-leveraging-aviation-data-for-strategic-allocation>, May 7, 2024, 4 pages.

Octopus, "Upgrade your Rideshare", available online at: <https://playoctopus.com/new-drivers/>, retrieved on Dec. 5, 2024, 5 pages.

PXCOM, "All our Articles", available online at: <https://pxcom.aero/inflight-entertainment-blog/>, retrieved on Dec. 5, 2024, 7 pages.

Statista, "Uber Technologies—statistics & facts", available online at: <https://www.statista.com/topics/4826/uber-technologies/#topicOverview>, Jun. 4, 2024, 6 pages.

Wikipedia, "In-flight advertising", available online at: <https://en.wikipedia.org/wiki/In-flight_advertising>, Feb. 18, 2023, 2 pages.

* cited by examiner

Fig. 3

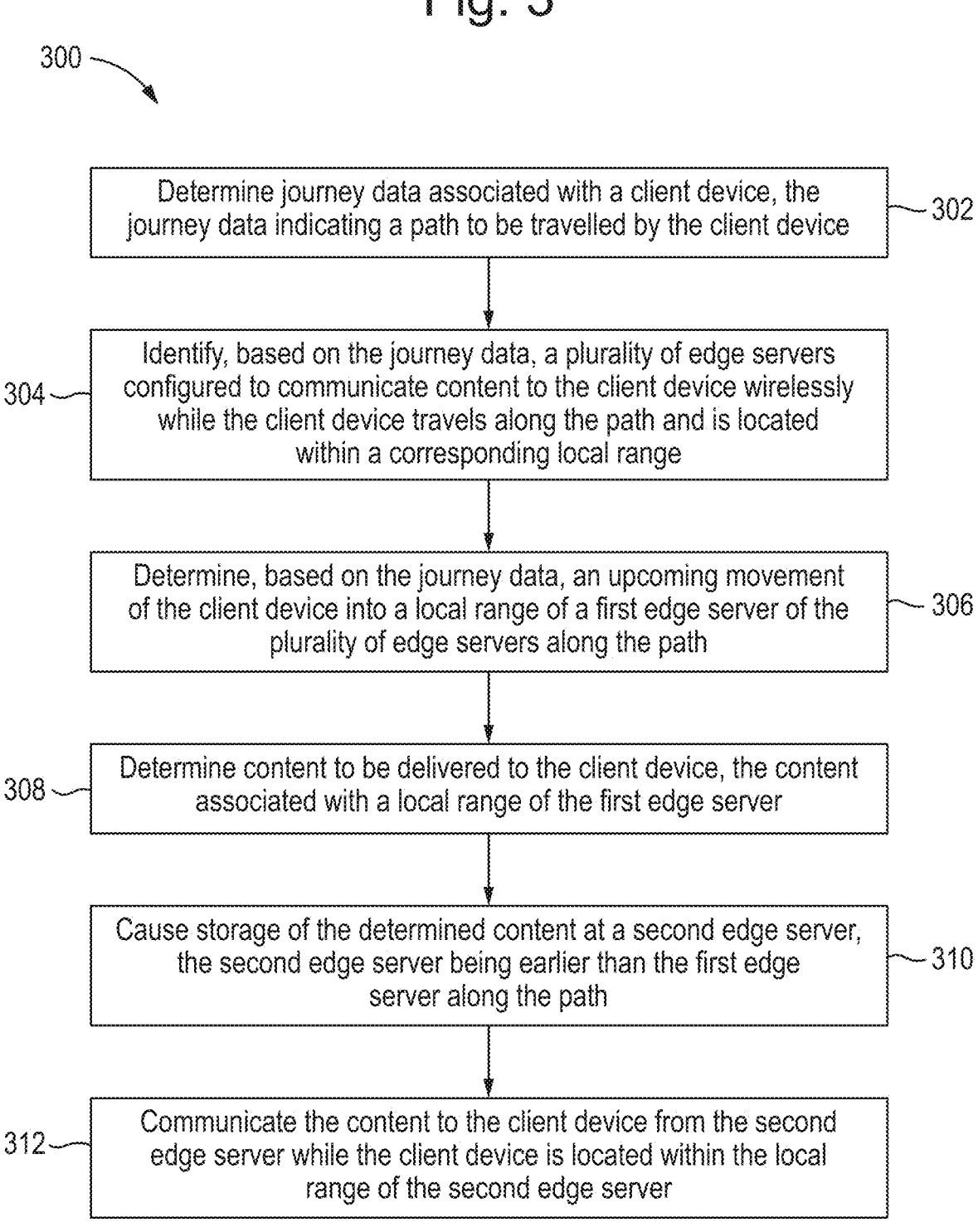

300

| | |
|---|---|
| Determine journey data associated with a client device, the journey data indicating a path to be travelled by the client device | 302 |

| | |
|---|---|
| 304 | Identify, based on the journey data, a plurality of edge servers configured to communicate content to the client device wirelessly while the client device travels along the path and is located within a corresponding local range |

| | |
|---|---|
| Determine, based on the journey data, an upcoming movement of the client device into a local range of a first edge server of the plurality of edge servers along the path | 306 |

| | |
|---|---|
| 308 | Determine content to be delivered to the client device, the content associated with a local range of the first edge server |

| | |
|---|---|
| Cause storage of the determined content at a second edge server, the second edge server being earlier than the first edge server along the path | 310 |

| | |
|---|---|
| 312 | Communicate the content to the client device from the second edge server while the client device is located within the local range of the second edge server |

Figure 6B:
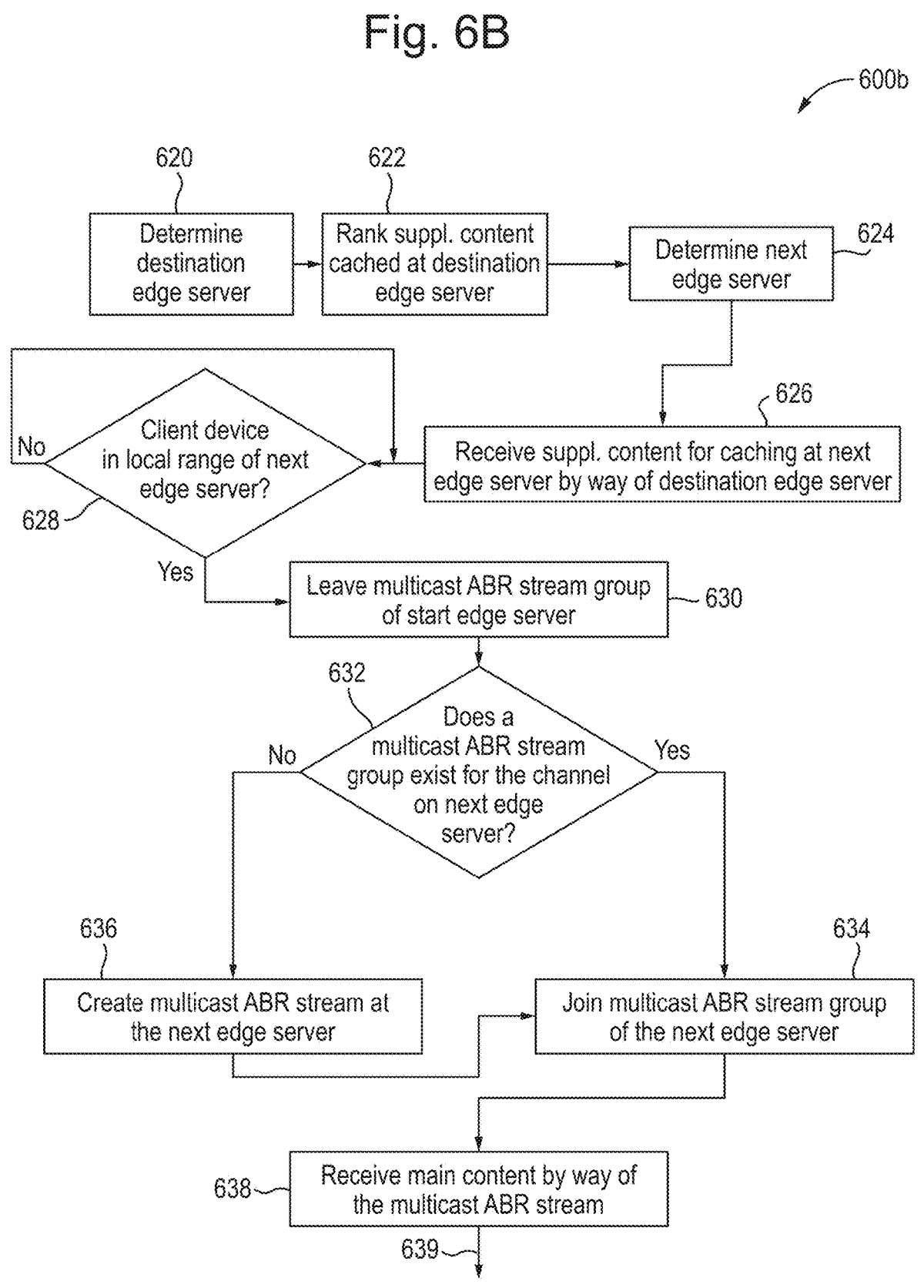

620
Determine destination edge server

622
Rank suppl. content cached at destination edge server

624
Determine next edge server

626
Receive suppl. content for caching at next edge server by way of destination edge server 628
Client device in local range of next edge server?

No

Yes

630
Leave multicast ABR stream group of start edge server

632
Does a multicast ABR stream group exist for the channel on next edge server?

No

Yes

636
Create multicast ABR stream at the next edge server

634
Join multicast ABR stream group of the next edge server

638
Receive main content by way of the multicast ABR stream

639

600c

Determine upcoming suppl. content marker
of main content — 640

642 — Obtain client device data

Rank, by client device, suppl. content cached
at current (next) edge server, based on client
device data — 644

646 — Receive suppl. content at client device from
current (next) edge server

Insert, by client device, suppl. content at
suppl. content marker for output — 648

649

METHODS AND SYSTEMS FOR DELIVERING CONTENT TO A CLIENT DEVICE

BACKGROUND

The present disclosure relates to methods and systems for delivering content to a client device. More particularly, but not exclusively, the present disclosure relates to delivering content to a moving client device as the client device moves along a path.

SUMMARY

Delivering streaming content to one or more client devices is made possible, for instance, by way of engagement of the client device with a remote server, such as a content server. The content server delivers video or other media in real-time or on-demand, typically via an internet connection. When client devices are in motion, however, such as during a journey, delivering a seamless streaming experience becomes significantly more challenging. The dynamic nature of mobile environments introduces several technical issues related to network performance, such as excessive latency, bandwidth constraints, and service interruptions, which must be addressed to ensure consistent, high-quality content delivery to moving devices.

One challenge may arise from excessive latency, which refers to the delay between the request for content and the receipt of that content by the client device. In streaming applications, particularly for real-time or near-real-time content (e.g., live television), latency should be reduced or minimized to provide a seamless experience. In dynamic environments, however, where numerous client devices may continuously transition between different communication entities, such as cellular towers, latency may be expected to increase due to handover delays and varying network conditions. This may be exacerbated when multiple devices within the same geographical area are competing for limited network resources, which may lead to delays in the delivery of streaming segments to a client device.

The challenges may be expected to scale in accordance with the number of devices streaming content in a given area. Mobile networks, particularly cellular networks, can typically have a finite amount of bandwidth available at any given time. When many client devices look to connect to the same cellular base station, congestion in data transmission may be expected, which can typically result in slower data rates, degraded quality of streamed content, and further increased latency, as well as effects on other streaming performance metrics. These scaling issues can also extend to a streaming server infrastructure responsible for providing the streaming service to the client devices, as a large number of simultaneous requests for streaming segments can increase the load on content delivery networks (CDNs), which are intended to distribute the content to multiple endpoints efficiently.

Related issues may include client-side buffering, which occurs when the device's media player preloads a portion of the streamed content to smooth out inconsistencies in the incoming data. When bandwidth fluctuates due to mobile or cellular network constraints, the rate at which the client device receives the streamed content may not be sufficient to sustain playback. This typically results in a pause in content playback while additional content is buffered or re-buffered, leading to an interrupted streaming service. This problem may become more pronounced when streaming high-bitrate content, such as HD or 4K video content, which can require a consistent, high-throughput connection to avoid re-buffering. Other issues may include switching of content or channels delivered to a client device during a journey, such as content or channels subject to server-side or server-guided insertion (such as any suitable supplemental content insertion, for example ad-insertion), which may suffer similar latency and re-buffering challenges.

The load on cellular base stations plays a crucial role in the quality of the streaming experience. As more users attempt to access video content simultaneously, the base stations become overloaded, leading to a reduction in the available bandwidth for each device. The increased streaming traffic can also introduce jitter, which refers to the variability in the time taken for data packets to arrive at a client device. Both latency and jitter can be highly detrimental to streaming services, as they disrupt the smooth and timely delivery of video segments. Jitter, in particular, causes uneven packet arrival, leading to choppy playback and poor-quality video, which the client-side buffering mechanisms may not fully mitigate. Such issues may be particular apparent in dynamic environments such as those in which numerous client devices are streaming content while in motion, such as on a journey.

Systems and methods are provided herein for addressing these challenges of latency, jitter, excessive buffering and/or variable bandwidth availability in the provision of streaming content to a client device while the client device is in motion, for example during a journey. In particular, systems and methods herein may permit hyper-local streaming of content to client devices, the hyper-local content delivery informed by data associated with the journey, for example the path to be travelled by the client device. The path to be travelled by the client device may, for example, indicate one or more edge servers with which the client device will be expected to engage to receive content, such as streaming content. Having knowledge of the journey data, for example including the path to be travelled by the client device, may therefore permit the present systems and methods to anticipate where content provision will be required during the journey. For example the present systems and methods having knowledge of the journey data may anticipate where in a network of edge servers, for example mobile edge servers, to deliver content such that the content is received by the client device while the client device is within a corresponding range of each the edge servers. The challenges presented by streaming content to a moving client device may be expected to scale with the number of client devices streaming the content from the edge servers. The present systems and methods may, having knowledge of which edge servers will be engaged at various times by the client devices, cause such edge servers to store or cache at least a portion of the content to be communicated to the client devices. Proximity of the client device to the edge server, combined with direct communication of locally-stored content to the client device may aid in addressing the challenges typically associated with streaming to a moving client device, such as the associated latency, jitter, buffering, and bandwidth availability. Content switching, either between channels or between main content and supplemental content (such as alerts, notifications or ads), can cause a reset in buffering of the content at the client device, and by pre-storing the content to be delivered by the second edge server, such buffering issues may be reduced. Benefits of such storing may be particularly observed in scenarios wherein the selection, communication or delivery of the supplemental content is based at least in part on the journey data, for example the a current or predicted location of the client device along the path. Such storing or caching of the content to be delivered may therefore reduce the burden of latency, jitter, buffering and bandwidth availability typically affecting such systems, while the content is communicated to the client devices.

According to systems and methods described herein, journey data may be determined, the journey data associated with a client device, the journey data indicating a path to be travelled by the client device. For example, the journey data may be received at or via a server from a client device, at a processor of the client device, or by way of a dedicated journey data server. The journey data may be any suitable data including an indication of the path to be travelled by the client device, such as a location or sequence of locations associated with the path, and may include any suitable indications such as temporal data, traffic data, obstruction data, field of view (FOV) data, or weather data. Any other suitable journey data will be appreciated, such as that described herein, for example a journey start location; a journey end location; a journey duration; a journey distance; one or more path locations along the path; a remaining journey time duration; a remaining journey distance; a journey time duration travelled; a journey distance travelled; a client device movement speed, such as an average movement speed; a client device velocity; a client device acceleration; a client device deceleration; a client device location; client device data; client device user data; any suitable traffic data such as traffic density data, traffic congestion data or traffic delay data; any suitable obstruction data such as previous obstruction data or predicted or upcoming obstruction data; any suitable diversion data; any suitable weather data.

It will be appreciated that the terms "communicate" and "deliver" are used synonymously herein. A plurality of edge servers may be identified based on the journey data, each edge server of the plurality of edge servers configured to communicate or deliver content to the client device (for example wirelessly) as the client device travels along the path and is located within a corresponding local range of the edge server. For example, the plurality of edge servers may be identified by a server using the journey data or by a processor of the client device using the journey data. Each of the edge servers will be understood to be configured to wirelessly communicate the content to the client device while the client device is located within a local wireless communication range of the edge server, for example along at least a portion of the path during the journey. The client device will therefore be understood as any suitable mobile, wireless-enabled client device. The wireless communication will be understood to be any suitable wireless communication. In some examples, as the client device moves along the path, the client device may be within a local range of at least one edge server of the plurality of edge servers while the client device travels along the path.

An upcoming movement of the client device into a local range of a first edge server of the plurality of edge servers along the path may be determined or predicted, based on the journey data. The upcoming movement may be determined or predicted to occur at any suitable spatial position or time along the path and may, for example, be associated with a destination or end-point of the path. In some such examples, the local range of the first edge server may comprise the destination or end-point of the path located therewithin.

Content to be delivered to the client device may be determined, the content associated with the local range of the first edge server. The determining of the content to be communicated to the client device may be performed in any suitable manner, and may for example include a selection of the content from a plurality of content, such as a plurality of content associated with the local range of the first edge server. The selection may be performed based on any suitable comparison, metric or ranking of the content, such as that described herein. The term "associated with the local range of the first edge server" will be understood to mean any suitable association, for example an association with a location or an entity located within the local range of the first edge server. In examples wherein the local range of the first edge server comprises the destination or end-point of the path located therewithin, the determined content may therefore be associated with the destination or end-point of the path, for example associated with an entity located within a proximity of the destination or end-point of the path.

In some cases, it may be expected that multiple client devices may be engaging with different streamed content, at different times and at different locations. Determining the content to be communicated to the client device may therefore permit the present systems and methods to anticipate the content that will be delivered to the client device in order to reduce latency associated with such provision.

Storage of the determined content at a second edge server of the plurality of edge servers may be caused. The second edge server may be positioned earlier than, or before, the first edge server along the path. The content may be accessed or received by the second edge server by way of any suitable content source. In some examples, the determined content may be received for storage by the second edge server. The storage of the determined content by the second edge server may be by any suitable storage, such as a cache memory. The term "earlier than the first edge server along the path" will be understood to mean that the second edge server comprises a local range which intersects the path at an earlier point thereon than the first edge server (or a local range thereof), such that the content is to be communicated to the client device by the second edge server earlier in the journey than by the first edge server. As such, the determined content may be communicated to the second edge server and stored thereon such that the content may be delivered to the client device directly by way of the memory of the second edge server. In some examples, the storage of the determined content at the second edge server may be performed following the determination of an upcoming movement of the client device into the local range of the second edge sever.

Examples will be appreciated wherein the second edge server is positioned later than, or after, the first edge server along the path. The term "later than the first edge server along the path" will be understood to mean that the second edge server comprises a local range which intersects the path at an later point thereon than the first edge server (or a local range thereof), such that the content is to be communicated to the client device by the second edge server later in the journey than by the first edge server.

The content may be communicated or delivered to the client device while the client device is located within a local range of the second edge server. As such, second edge server may be configured to store the determined content such that the content may be communicated directly to the client device by way of the storage, while the client device is located within the corresponding local range. Such direct communication of the pre-stored content may aid in reducing latency and jitter typically associated with content streaming. The determined content may be communicated to the client device in any suitable manner, such as following receipt of instruction from the client device at the second edge server to communicate the content. Such instructions may, for example, be communicated by the client device based on a content marker, the client device configured to output the content at the content marker. The proximity of the client device to the second edge server within the local range thereof may aid in reducing latency associated with communication between the client device and the second edge server, such as for communication of content to the client device or communication of instruction to the second edge server.

In some examples, an upcoming movement of the client device into the local range of the second edge server may be determined based on the journey data, wherein the causing of the second edge server to store the content is performed based on the determination. In such examples, pre-storage or pre-caching may be performed in anticipation of the arrival of the client device, as it moves along the path, into the local range of the second edge server. Such pre-storing or pre-caching may enable the second edge server to deliver the content to the client device as soon as the client device enters the local range of the second edge server, such that a seamless content provision is provided.

In some examples, the determined content may be received at the second edge server by way of the first edge server for storage. In some such examples, the content may be received at the second edge server from the first edge server, for example by way of a communications network. In some examples, the plurality of edge servers form part of an edge server network. In some such examples, the communication of the content from the first edge server to the second edge server may be based on instructions received at the first edge server from an edge server controller configured to communicate with each edge server in the edge server network. In some examples the content may be received at the second edge server from a content server (which may be separate to the plurality of edge servers), for example based on instructions from the edge server controller. Such a hand-over of the content from the first edge server to the second edge server may permit availability of the content for communication at appropriate stages along the path while permitting efficient management of content storage within the plurality of edge servers, such that unnecessary storage is avoided.

In some examples, the content is supplemental content configured to be inserted, for example at or by the client device, at a supplemental content marker of a main content, wherein each of the plurality of edge servers is configured to communicate or deliver the main content to the client device (for example wirelessly) while the client device travels along the path and is located within the corresponding local range of the edge server.

While communication of the main content at the client device may be variable and in some cases may be subject to client-side content switching (such as channel switching), in cases wherein the determined content is supplemental content (such as, for example, alerts, notifications or ads), such supplemental content can be pre-determined for communication to the client device by the present systems and methods. The client device may, in such examples, therefore be configured to receive, or instruct receipt, of the determined supplemental content for output at the supplemental content marker, which may be independent of the main content. Therefore, while in some examples the main content may be variable and subject to content switching (such as channel switching), the supplemental content may be pre-determined and pre-stored at the second edge server for direct provision to the client device for output at the corresponding supplemental content marker. As the client device moves along the path, the switching between the provision of main content and the provision of supplemental content may typically cause a reset in buffering, which may subject to latency and thereby cause an interruption to the content service. Predetermining and storing the supplemental content for direct communication to the client device by way of the second edge server storage may help to reduce the effects of such a buffering reset.

The association of the content with the local range of the first edge server can permit the present systems and methods to deliver supplemental content, such as in the form of alerts (such as emergency or public service alerts), notifications, or ads, which are associated with a future portion of the path of the client device. As such, events forecasted to occur at a later portion of the journey, which may in some examples be stored as content (for example supplemental content) at the first edge server, may be communicated to the second edge server for storage and communication to the client device at an earlier point in the journey. As discussed herein, the content (for example supplemental content) may be associated with a location or entity located within the local range of the first edge server. In such examples, the content (for example supplemental content) may comprise an alert, notification or ad associated with the location or entity.

In examples wherein the content is supplemental content configured to be inserted, or caused to be inserted, at a supplemental content marker of a main content, for example by the client device, the main content may be a multicast content stream. The present systems and methods may therefore leverage the improved bandwidth efficiency and optimized data delivery of a multicast stream compared with a series of unicast streams. It will be appreciated therefore in such examples that each edge server is configured to communicate the main content to multiple such client devices, the multiple such client devices receiving the main content from the edge server forming a multicast stream group of the edge server. In some examples, it may be determined that the last client device of a multicast stream group of an edge server has moved out of the corresponding local range of the edge server, and in response to such a determination, the edge server may be configured to terminate the multicast stream. In some examples, it may be determined that a client device has moved into the local range of an edge server, and in response to such a determination, the edge server may be configured to receive the main content, for example from a main content server, and generate a multicast stream or a corresponding multicast stream group, for example where one is not already generated. In some examples, an upcoming movement of the first client device into the local range of the edge server may be determined, and in response to such a determination, the edge server may be configured to receive the main content, for example from a main content server, and generate a multicast stream or a corresponding multicast stream group, for example where one is not already generated.

In some examples, the multicast stream may be a multicast adaptive bitrate (ABR) stream. In such examples, the present systems and methods may permit bitrate switching to improve buffering of the main content at the client device. In some such examples, generating the multicast stream or the corresponding multicast stream group may comprise transcoding the main content, for example a high bitrate version of the main content, to provide a bitrate ladder for enabling ABR streaming of the main content.

In some examples, the multicast stream may be a multicast stream for a single content channel or a single content item. In some such examples, the determined content may further comprise an association with the single content channel or the single content item. In some such examples, the determination of the content may be based on the association of the content with the single content channel or single content item. In some examples, determining the content may comprise predicting a channel change of the main content, for example following receipt of channel change instructions received at an edge server of the plurality of edge servers form the client device. In such examples, the predicted channel change may be based on any suitable prediction method, and may for example be based on client device data or client device user data associated with the client device, such as historic client device data or client device data indicating behavior or activity associated with the client device or the client device user and a location of the client device. Such a predicted channel change may be used to determine the content to be received at the second edge server for communication or delivery to the client device while the client device is located within the corresponding local range of the second edge server. Such a channel change prediction may enable delivery of content or supplemental content stored at the second edge server which is associated with the new content channel or new content item following the predicted channel change, and may therefore reduce communication and storage, for example unnecessary communication and storage, of unrelated content or supplemental content.

In some examples, the main content comprises streaming television channel content, and may in some examples comprise free advertising-supported streaming television (FAST) channel content. In such examples, an application of the client device may be configured to instruct receipt of the main content at the client device, from a main content server by way of the plurality of edge servers, for output at the client device. In some examples, the application of the client device may instruct receipt of the supplemental content at the client device, from the second edge server.

In some examples, the plurality of edge servers form a sequence of edge servers along the path, the method further comprising switching from the communication of the main content from an edge server in the sequence, to a communication of the main content by the next edge server in the sequence, wherein said switching is seamless. Any suitable manner of switching from the communication of the main content from the earlier edge server to communication of the main content from the next edge server in the sequence will be appreciated. For example, an upcoming movement of the client device from the local range of the earlier edge server to the local range of the next edge server in the sequence may be determined. In response to such a determination, the earlier edge server may cease communicating or delivering the main content to the client device, and the next edge server in the sequence may immediately begin communicating or delivering the main content to the client device, such that the transition between the earlier edge server and the next edge server in the sequence is seamless. In some examples wherein the main content comprises a multicast content stream, the switching may comprise leaving, by the client device, the multicast content stream group of the earlier edge server and immediately joining, by the client device, the multicast stream group of the next edge server in the sequence.

In some examples, the communicating or delivering of the supplemental content to the client device may comprise: determining the supplemental content marker within the main content; and the supplemental content for output at the supplemental content marker. It will be understood that determining the supplemental content marker within the main content may comprise identifying an existing supplemental content marker in the main content (for example by the second edge server, by the client device, such as an application of the client device, or by a content server), instructing (for example by the client device, the second edge server or the content server) the generation of the supplemental content marker within the main content (for example by second edge server, the client device, such as an application of the client device or the content server), or generating the supplemental content marker in the main content (for example by second edge server, the client device, such as an application of the client device, or the content server). In some examples, the supplemental content may be inserted or caused to be inserted, for example by the client device, at the supplemental content marker, for example for output by the client device. Client-side supplemental content insertion and output, for example controlled by an application of the client device, may in some embodiments permit personalization of the communication of the supplemental content to the client device, for example based on the journey data, which may include client device data or client device user data. Examples will be appreciated wherein determination (or insertion) of the supplemental content or the supplemental content marker (including the determination of the position thereof) may be performed by the second edge server or by a content server separate to the plurality of edge servers. In examples wherein determination (or insertion) of the supplemental content or the supplemental content marker (including the determination of the position thereof) is performed by the content server separate to the plurality of edge servers, the supplemental content may be communicated to the content server prior to said determination or insertion. In such examples, the content server may communicate the supplemental content, such as inserted in the main content, to the second edge server prior to communication of the supplemental content to the client device.

In some examples, determining the supplemental content marker within the main content comprises: determining a supplemental content marker position based on the journey data; and inserting the supplemental content marker within the main content at the determined supplemental content marker position. In some examples therefore, the present systems and methods may make use of the journey data determine a position of a supplemental content marker, for insertion and output of the supplemental content. Control of the position of the supplemental content marker in a suitable content, for example advertising video on demand (AVOD) content, based on the journey data may permit customization and personalization of the positioning of the supplemental content within the main content. It will be appreciated that a plurality of supplemental content marker positions may be determined. In some such examples, the plurality of supplemental content marker positions may be temporally spaced from one another in accordance with a spacing value, for example in order to control a frequency of output of the supplemental content or a time period between the output of the supplemental content. The one or more supplemental content marker positions, or the spacing values thereof, may in some examples be based on the journey data. Any suitable journey data may be used to determine the one or more supplemental content marker positions, or the spacing values thereof. In some examples the journey time remaining may be used to determine a frequency of output of the supplemental content or a time period between the output of the supplemental content. Such control of the supplemental content frequency or intervening time period in the manner may, for example, optimize the frequency or spacing of the supplemental content according to a journey time, such as a time remaining, and may therefore be used to reduce unnecessary communication of content to, or output of content of, the client device. In cases where, for example, the supplemental content is an alert or notification, such as a safety alert or notification, the frequency may at least in part be based on a determined importance value of the alert or notification, wherein a higher importance (such as for a more critical safety concern associated with the location along the journey or path) may cause a determination of a higher frequency or a shorter spacing value.

In some examples, the content may be modified based on the journey data; wherein communicating or delivering the content to the client device comprises communicating or delivering the modified content to the client device. Any suitable modification based on the journey data may be appreciated. For example, the content associated with the local range of the first edge server may be associated with a particular location or entity located within the local range of the first edge server. Based on the journey data, for example an expected time of arrival of the client device within the local range of the first edge server, or within a proximity (for example a threshold proximity) of such a location or entity therewithin, the content may be modified based on the expected time of arrival. For example the content may be modified according to a time-limited parameter, such as for example a predicted weather status at a time instance or period, an appointment time or opening time at an entity or establishment at the location, or a time-limited deal associated within the entity or establishment. It will be appreciated that the modification may be based on any suitable journey data or portion thereof, such as client device data or client device user data. For example, it may be determined from client device data or client device user data that the client device or the client device user has visited the location, entity or establishment on a previous occasion, and the content may be modified according to such a determination.

In some examples, the content may be determined from a plurality of content, each content associated with a local range of an edge server of the plurality of edge servers. In some examples, each content of the plurality of content is associated with the local range of the first edge server. In such examples, the content may be determined from a plurality of content associated with the local range of the first edge server. In some examples, each content of the plurality of content is associated with a physical or virtual location within the corresponding local range; or an entity or establishment located at the physical or virtual location. It will be understood that the term "associated with" the local range, a physical or virtual location therewithin, or an entity or establishment therewithin, may comprise any suitable association. In some examples, the association may comprise a location tag, for example a GPS tag, associated with the content, for example as part of metadata associated with the content. The association may comprise any suitable link or tag in connection with the local range, a physical or virtual location therewithin, or an entity or establishment therewithin as will be appreciated. For example, the association may indicate that the entity or establishment is located at the corresponding location, but examples will be appreciated wherein the entity or establishment is not located at the corresponding location, such that the location represents a virtual location of the entity or establishment, and is associated with the location by way of said tag, metadata or other suitable association. In some examples the virtual location may represent a location in a virtual environment.

In some examples, the content may be determined, for example from the plurality of content, based on one or more selected from: a context associated with a location within the local range of the first edge server, the content associated with the location; a context associated with the physical or virtual location associated with the content; a distance between a location within the local range of the first edge server and a position along the path, the content associated with the location; a distance between the physical or virtual location associated with the content and a location along the path; client device data; client device user data; a ranking associated with the content within a plurality of content; a location of the client device along the path; the journey data; a movement speed, velocity, acceleration or deceleration of the client device, or any suitable indication of how quickly the client device may move from a journey source to a journey destination, or between any suitable two locations along the path, such as from a local range of one edge server to a local range of another edge server; a content of a plurality of content communicated to the client device; a main content of a plurality of main content communicated to the client device; a main content channel of a plurality of main content channels communicated to the client device; a multicast content stream or a multicast content stream group of the client device; multicast stream group data associated with a multicast content stream group of the client device; a detected or predicted receipt of channel change instructions from the client device.

In some examples, the context associated with the physical or virtual location associated with the content may be a context associated an entity or establishment located at the physical or virtual location. The context may be any suitable context, such as for example, an opening time,. By way of example wherein the context comprises opening times of the physical location, virtual location, or entity or establishment located thereat, it may be determined that, based on the journey time, an expected time of arrival of the client device at or within a proximity (for example a threshold proximity) of the location, entity or establishment, is outside of the opening times. In such an example, supplemental content associated with the location, entity or establishment may be deprioritized in a ranking or selection of content from a plurality of content, or may not be determined for communication to the client device.

In some examples, the distance between the physical or virtual location and the path may be based on a determined upcoming location along the path to which the client device will move, for example a destination location, the determined upcoming location being located within the local range of the first edge server. The distance between the physical or virtual location associated with the content and such a determined upcoming location of the client device may therefore be used to determine the content to be received at the second edge server for storage and to be wirelessly communicated to the client device from the second edge server while the client device is located within the local range of the second edge server. For example, such a distance may be determined for each content and the content may be ranked at least in part based on the distance, such as from shortest distance to longest distance. Therefore, in such examples the content most spatially associated with the determined upcoming location of the client device may be selected for receiving and storing at the second edge server. It will be appreciated that any other factors may contribute to the ranking of the plurality of content, such as for example as a result of a bidding process, and in some examples the ranking may be based on a combination of the determined distance and a bid associated with a content. In such examples, a bid may alter the ranking of a content such that the rank is not exclusively based on the distance. In such examples, the determined content may not comprise a closest associated distance to the determined upcoming client device location.

In some examples, the ranking associated with the supplemental content may be according to any suitable ranking method, and the ranking may in some examples be based on any suitable portion, or combination of two or more portions, of the journey data. In some examples, an association of the content with the journey start location, journey end location, one or more path locations along the path, a client device movement speed, velocity, acceleration, deceleration, or a client device location may be used at least in part to determine the content, or the ranking of the content in the plurality of content. For example if a content, such as supplemental content discussed herein, is associated with a business having a business location proximate to the journey start location, journey end location, or one or more path locations along the path, such a proximity may be used to determine the content or the ranking of the content in the plurality of content. In some examples, the journey time remaining, or the client device movement speed, velocity, acceleration or deceleration, in combination with the journey distance remaining, may be used at least in part to determine the content or the ranking of the content in the plurality of content, such as based on a duration of the content, or a time-limited feature of the content. In some examples, any suitable client device data or client device user data may be used at least in part to determine the content, or the ranking of the content in the plurality of content. In some such examples, models, patterns, trends or correlations associated with the client device may be determined or predicted from, for example, historical client device journey data, paths traversed by the client device, locations associated with the client device, client device transaction data, client device application data, client device settings, client device user preferences, client device user activity data, client device user social networking data, client device user personal or identification data, or any other suitable client device data or client device user data.

In some examples, determining the content based on a content, a main content or a main content channel of a plurality of content, main content or main content channels communicated to the client device may comprise determining an association between the content to be delivered and the content, main content, or main content channel currently being communicated to the client device, or a content, main content or main content channel predicted to be communicated to the client device. Determining the association may be performed in any suitable manner. In some examples, determining the content based on a multicast content stream or a multicast content stream group of the client device may comprise determining an association between the content to be delivered and the multicast stream or the multicast stream group. For example, data associated with the multicast content stream group may be used to determine the association. For example data associated with a plurality of client devices within the multicast content stream group, such as client device user data within the group (including any suitable client device data or client device user data as described herein) may be used to determine the association. In some examples, determining the content based on a detected or predicted receipt of channel change instructions from the client device may comprise detecting or predicting the receipt of the channel change instructions, which may be based on any suitable data, such as client device data or client device user data, such as for example any determined patterns or models of historic client device data or client device data, such as activity or behavior data.

It will be appreciated that the content may be determined by the client device and/or by the second edge server. In some examples, a first determination of the content may be performed by the second edge server, and a second determination of the content may be performed by the client device following the communication of the determined content to the client device from the second edge server. For example, the first determination may be performed based on a first portion of the journey data, and the second determination may be performed based on a second portion of the journey data. The second portion of the journey data may be comprised within, or accessed by, an application of the client device, and used to perform the second determination. The second portion of the journey data may comprise client device data or client device user data as described herein.

In some examples, the journey data may comprise one or more selected from: a journey start location; a journey end location; a journey duration; a journey distance; one or more path locations along the path; a remaining journey time duration; a remaining journey distance; a journey time duration travelled; a journey distance travelled; a client device movement speed, such as an average movement speed; a client device velocity; a client device acceleration; a client device deceleration; a client device location; client device data; client device user data; any suitable traffic data such as traffic density data, traffic congestion data or traffic delay data; any suitable obstruction data such as previous obstruction data or predicted or upcoming obstruction data; any suitable diversion data; any suitable weather data.

In some examples the client device comprises a rideshare device, wherein the journey data may comprise rideshare data indicating a rideshare path. The rideshare data may further comprise a rideshare profile of a user of a rideshare service, the rideshare profile providing journey data associated with the user, and wherein the content is determined based at least in part of the rideshare data.

It will be appreciated that the content may be any suitable media content, and may comprise one or more selected from: image data; video data; audio data; text data; closed-caption or subtitle data; chat data; any suitable artificial intelligence (AI) data, such as AI agent data for example; notification or alert data; temporal data; any suitable interactive elements or data; location data including an association with a location, such as a physical or virtual location. The supplemental content may, in some examples, be any suitable content associated with emergency safety information may relate to a hazardous situation at a location along the journey or proximate one or more locations along the path (such as a destination location). One or more content portions of the supplemental content may, in such examples, relate to any suitable information associated with the situation, such as a wildfire boundary, safety zones, air quality, evacuation routes, road closures, wind direction, among others as will be appreciated.

In some examples, a movement of the client device to a journey end location, to within a threshold proximity of the journey end location, or into the local range of the first edge server, may be determined. In some such embodiments, communication of the content to the client device may be terminated. For example, in some cases the communication of the content to the client device may be restricted to the journey, and following a determination that the journey has ended, that a journey end location has been reached by the client device (or to within a threshold proximity thereto), that a final location in a sequence of locations along the path has been reached by the client device (or to within a threshold proximity thereto), or that the client device has moved into the local range of the first edge server, the communication of the content (which may include the main content, the supplemental content, or both) to the client device may be terminated, either by the first edge server or by the client device, for example an application of the client device.

In some examples, the content may be communicated to a content server prior to, or following the determination of the content. Following communication of the content to the content server, the content server may perform server-side supplemental content insertion.

It will be appreciated that any process steps and functionality of the present disclosure, in any suitable combination thereof, may be performed on the client device or at a server, such an edge server, a content server, a supplemental content server, or a client device application server. The performance of steps or functionality at a server may in some cases act to conserve memory and computational processing resources on the client device.

It will be appreciated that any features described herein as being suitable for incorporation into one or more examples of the present disclosure are intended to be generalizable across any and all examples of the present disclosure.

BRIEF DESCRIPTION OF THE DRAWINGS

The above and other objects and advantages of the disclosure will be apparent upon consideration of the following detailed description, taken in conjunction with the accompanying drawings in which:

FIG. 3 is a flowchart representing a process for delivering content to a mobile client device, in accordance with some examples of the present disclosure;

FIG. 5 depicts a sequence diagram outlining an example sequence of process steps for performing a delivering of content to a mobile client device, in accordance with the present disclosure;

FIG. 6A to FIG. 6D each depict a flowchart representing steps of a portion of a further example process for delivering content to a mobile client device, in accordance with the present disclosure.

DETAILED DESCRIPTION

Figure 1:
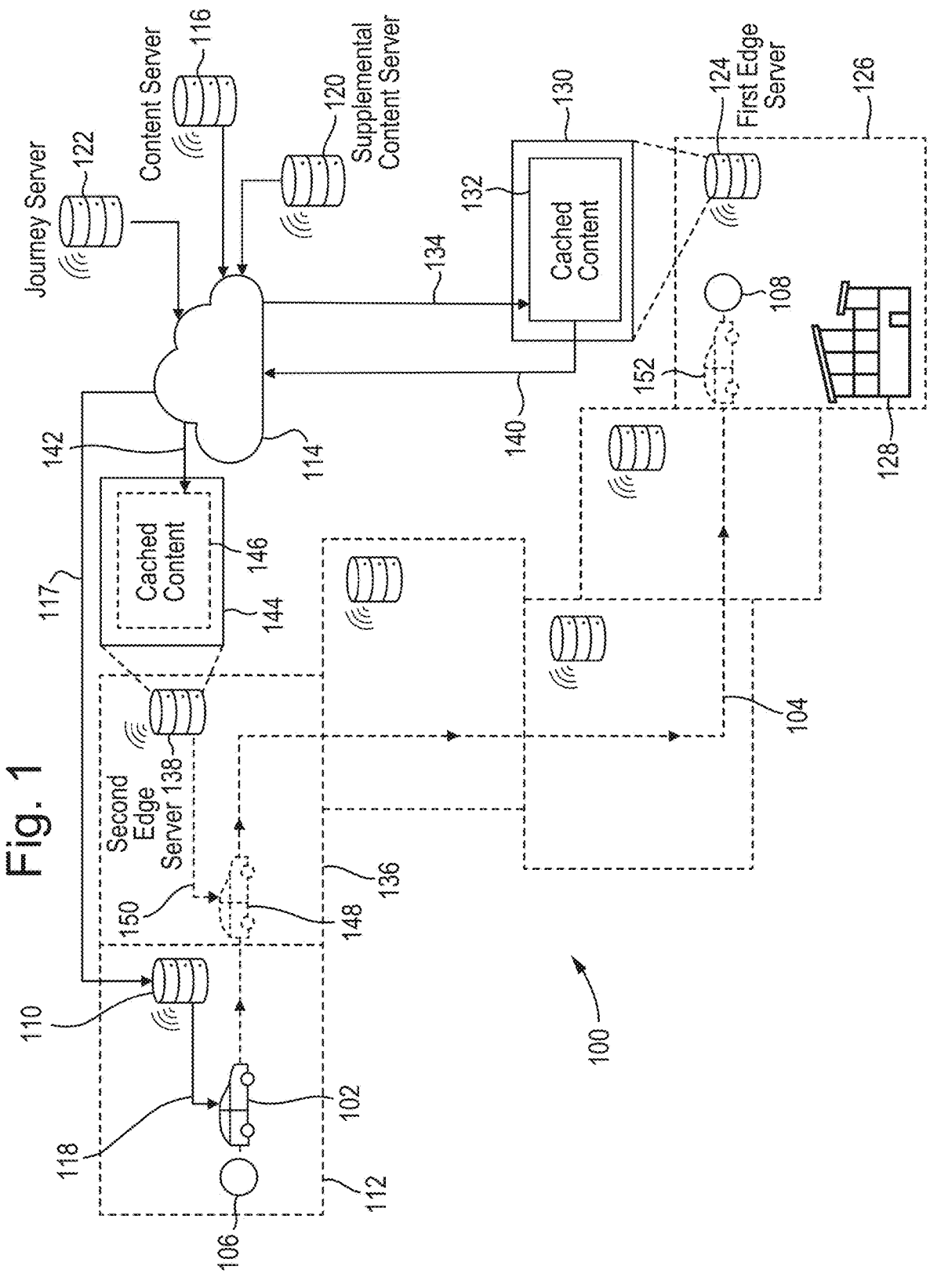
FIG. 1 illustrates an overview of a system for delivering content to a mobile client device, in accordance with the present disclosure.

FIG. 1 illustrates an overview of a system 100 for delivering content to a mobile client device in accordance with the present disclosure. In the example shown, the system 100 performs a rideshare scenario in which a vehicle 102 engaging in a rideshare scheme comprises a client device (not shown) located therein. In the rideshare scenario shown, a user (not shown) may engage the rideshare vehicle 102 to travel on a journey. During the journey, the user may wish to consume main media content by way of a media application of the client device located in the rideshare vehicle 102. In the example shown, the main media content is free advertising-supported streaming television (FAST) content, but any suitable media content will be appreciated. As part of the rideshare scenario shown, a main media content application is executed on the client device in order to output the FAST content to the user by way of a display screen and speakers of the client device. Further as part of the rideshare scenario, a rideshare application is engaged on a rideshare device located in the vehicle 102, which is separate to, but in communication with, the client device. The rideshare application of the rideshare device is configured to obtain journey data associated with the user's intended journey, the journey data obtained from of a journey server 122 by way of a communications network 114, which in the example shown is the internet. In particular the journey data includes a path 104 to be travelled by the vehicle 102 and therefore by the client device, the path comprising a start location 106, and end location 108 and a sequence of locations therebetween defining the path. As an example, the journey data is accessed from the journey application of the rideshare device by the main media content application of the client device by way of a suitable application programming interface (API).

The journey data is used, for example by the main media content application, to determine a sequence of edge servers 110 of an edge server network, the edge servers configured to wirelessly communicate media content, such as the main media content, to the client device of the vehicle 102 while the client device of the vehicle 102 is located within a corresponding local wireless range 112 of the edge server 110. The sequence of edge servers 110 is determined, for example, based on the path, such that each of the sequence of locations along the path are located within a local wireless range of one of the edge servers. In the example 100 shown, the main media content is accessed by the edge servers 110 from a media content server 116 by way of the communications network 114 and communicated 118 to the client device from the edge server 110 while the client device is located within the corresponding local range 112 of the edge server 110.

The edge servers 110 are further configured to communicate supplemental content to the client device in addition to the main media content, the supplemental content accessed by the edge servers 110 from a supplemental content server 120. The supplemental content may be any suitable supplemental content as described herein.

Each supplemental content is associated with a local range 112 of at least one of the edge servers 110, and may be associated with a particular physical location located within the local range 112 in any suitable manner. In the present example, each supplemental content comprises an associated GPS tag corresponding with a physical location within a local range 112 of an edge server 110. Examples will be appreciated wherein the association of a supplemental content with a physical location is by way of any suitable tag, link or metadata. Examples will be appreciated wherein the supplemental content is associated with an entity or establishment located at a physical location within the local range 112, or wherein the location within the local range 112 which is associated with the supplemental content represents a virtual location of an entity or establishment not physically present at the location.

In the example system 100 shown, the supplemental content associated with a local range 112 of an edge server 110 is stored or cached at a memory of the corresponding edge server 110, following communication 134 of the supplemental content to the corresponding edge server 110 by way of the supplemental content server 120. The main media content application of the client device is configured to determine from the journey data, and in particular the path, a first edge server 124 of the sequence of edge servers 110 having a local range 126 associated with the destination location 108 of the path. In particular, the main media content application of the client device is configured to instruct a ranking or screening of a plurality of supplemental content 132 cached or stored in a memory 130 of the first edge server 124. For example the ranking or screening may be based on a proximity of the location associated with each supplemental content to the destination location 108 of the path 104. Examples will be appreciated wherein the ranking or screening is performed in any suitable manner such as described herein. In the particular example shown, the ranking or screening assigns a rank to the cached supplemental content 132 based on a proximity of the associated location to the destination location 108 of the path 104. In the particular example shown, the highest ranked supplemental content 132 is associated with an establishment located proximate to the destination location 108 of the path 104.

The determined cached supplemental content 132, which in the present example is a safety alert associated with the establishment 128 located within the local range 126 of the first edge server 124, may act to provide useful safety information to the user of the rideshare service in advance of arrival of the user at the destination location 108. Accordingly, the main media content application of the client device is configured to determine an upcoming second edge server 138 which comprises a local range 136 into which the client device is predicted to move, based on the path 104, the second edge server 138 occurring earlier in the path than the first edge server 124. For example, the determining of the upcoming second edge server 138 may be performed following the instructed determination of the cached supplemental content 132 associated with the establishment 128 proximate the destination location 108. Examples will be appreciated wherein the steps of the example 100 shown are performed in any suitable order within the context of the present disclosure. Once the upcoming second edge server 138 is determined, the main media content application of the client device may be configured to instruct the communication of the determined cached content 132 for storage at the second edge server 138. For example, a communication indicating the stored cached content may be communicated 140 to the supplemental content server 120 from the first edge server 124 by way of the communications network 114, and the supplemental content may be communicated 142 to the second edge server for storage 146 in a memory 144 of the second edge server 138. Examples will be appreciated wherein a copy of the stored cached content 132 is communicated directly to the second edge server 138 by way of the communications network 114, or by way of a central edge server network operator, for storage in the memory 144 of the second edge server 138.

In the example shown, when the vehicle (and client device) enter the local range 136 of the second edge server 138, the second edge server 138 is configured to communicate 150 the main content and the cached supplemental content 146 associated with the establishment 128 within the local range 126 of the first edge server 124 to client device for output to the user by way of the main media content application, while the vehicle 148 is in the local range 136.

In the example 100 shown, the main media content application on the client device is configured to determine the presence and location of supplemental content markers within the main content, the supplemental content markers indicating a position within the main content at which the supplemental content may be inserted into the main content for output to the user. In some examples wherein the content is a suitable content, such as AVOD content for example, the client device (for example the main content application) may be configured to generate one or more of the supplemental content markers based on the journey data or based on client device data obtained from the client device. For example the journey data may indicate, or may be used to determine, an estimated time remaining for the journey. The journey data may in some examples indicate a distance remaining along the path to the destination location 108 from which the journey time remaining may be estimated, for example based on a vehicle or client device movement speed (such as an average speed, or a velocity, acceleration or deceleration). In some examples the client device (for example the main media content application) may use the estimated time remaining to determine a corresponding supplemental content frequency or duration. The client device (for example the main media content application) may generate, insert or instruct insertion of, supplemental content markers at supplemental content marker positions within the main content based on the time remaining or the determined supplemental content frequency or duration. Such generation, insertion or instruction to insert, supplemental content markers by the client device may be additionally, or alternatively, based on the client device data. For example the client device data may comprise data indicative of user activity, and may indicate a custom pattern of supplemental content output for a particular user. With reference to the example 100 shown, the client device may comprise, or access by way of the rideshare device, a rideshare profile of the user, which may indicate models or patterns in user behavior or activity which may be used to determine the supplemental content marker position or frequency.

The client device may be configured to perform an additional determination, ranking or screening of the cached supplemental content 146, for example based on the journey data, the client device data, or any suitable data as discussed herein. As such the client device may provide an additional customization or personalization of the determined supplemental content prior to output at the client device. Following communication 150 of the cached supplemental content 146 (optionally following additional screening, ranking or determination by the client device), the client device may insert the supplemental content at the determined supplemental content markers of the main content.

In the example shown, the main FAST content is delivered to the client device as a multicast content stream to leverage the bandwidth and data management benefits over unicast streams. Specifically the main content is communicated from the edge servers as a multicast adaptive bitrate (ABR) stream to a multicast group of client devices within the corresponding local range of the edge server. When a client device leaves the local range of an edge server and enters the local range of the next edge server in the determined sequence of edge servers along the path, the client device is configured to leave the multicast group of the previous edge server and to join a multicast group of the subsequent edge server. Such a switching of multicast groups may be performed in any suitable manner as will be appreciated. In some examples, a multicast group at a particular edge server may not be generated. In such examples, an edge server of the sequence of edge servers may determine a movement, such as an upcoming movement, of the client device into the local range of the edge server without the multicast stream, and may instruct the generation of a multicast stream for said edge server. Other examples will be appreciated wherein the determination and instructing may be performed by the edge server without the multicast stream, for example following determination of a movement, for example an earlier or upcoming movement, of the client device into the local range of the edge server without the multicast stream.

During the communication of the main content to the client device, the client device may communicate instructions, such as following interaction from a user to the edge server to change a channel of the main content from a current channel to a selected channel. Following receipt of the channel change instructions, the edge server may cause the client device to leave the multicast stream for the current channel, and to join a multicast stream for the selected channel, optionally including generating by the edge server the multicast stream for the selected channel. Such a channel change may be preceded or followed by a determination, for example by the client device or by the edge server, of one or more supplemental content markers in the main content of the selected channel. Such a determination may in some examples comprise generating and inserting the supplemental content markers at corresponding positions within the main content, such positions optionally determined by the client device, the edge server or the main content server. In such examples the content may be any suitable form of content, such as AVOD content.

In the example 100 shown, following arrival of the vehicle 152 (and the client device therein) at the destination location 108, it may be determined (for example by the client device or by the first edge server 124) that the client device is located at or proximate the destination location 108 and the first edge server may be configured to, in response to said determination, terminate the communication of the main content to the client device. In the specific rideshare scenario example described, the provision of the FAST channel content may be terminated upon arrival by the user at the selected rideshare destination, thereby causing ceasing the provision of rideshare services including the provision of the FAST channel content. While in the present example 100, the main content is FAST channel content, any suitable content may be envisaged, including but not limited to advertising video on demand (AVOD) content.

While the example 100 of FIG. 1 discusses a single hand-over of supplemental content to an earlier edge server by way of an edge service positioned further along the path than the earlier edge server, any manner of supplemental content hand-over may be appreciated within the context of the present disclosure wherein the supplemental content is cached for communication to the client device and wherein the supplemental content is associated with a local region of an edge server at which the supplemental content is cached. For example multiple such supplemental content handovers may occur throughout the journey, from and to various of the edge servers in the sequence of edge servers. While in the example 100 of FIG. 1, a single path 104 is described and shown, examples will be appreciated wherein adjustments to the path may be determined during the journey, such adjustments for example due to diversions, delays or for any other reason. It will be appreciated that each subsequent determined path may be associated with a determination of a corresponding sequence of edge servers as described.

Figure 2:
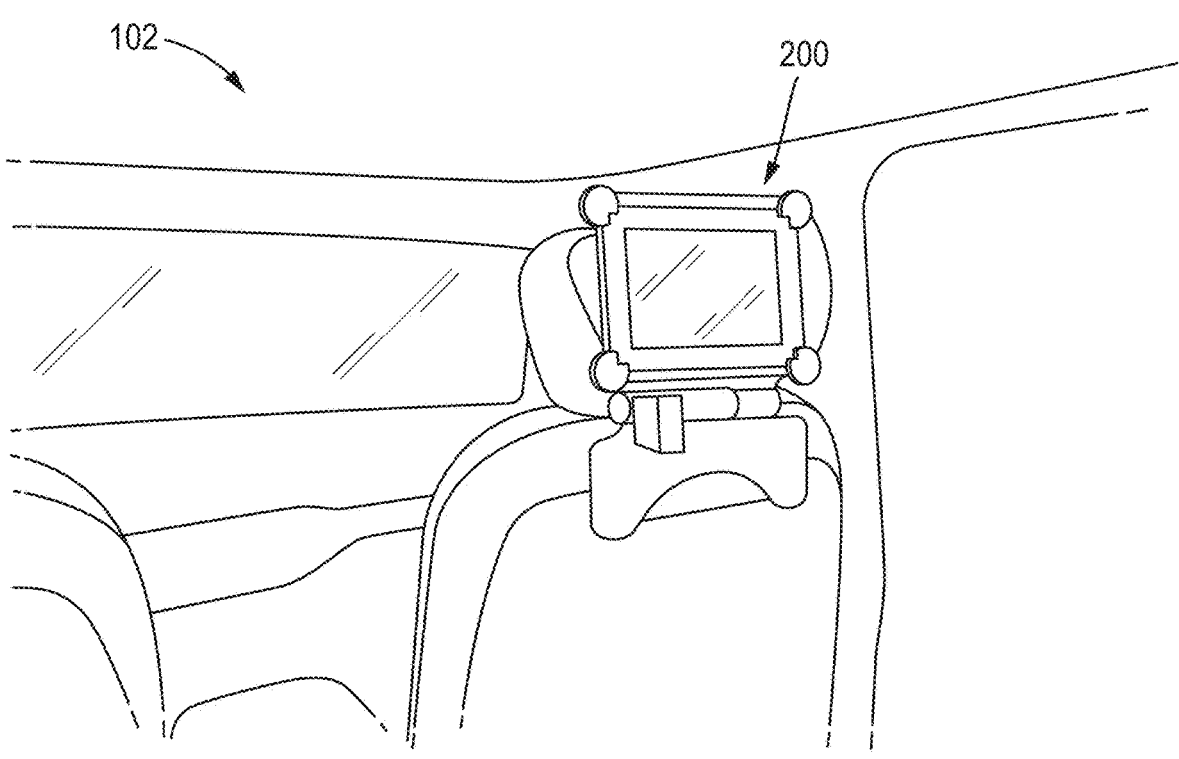
FIG. 2 depicts an example client device suitable for use with the systems and methods of the present disclosure.

An example client device 200 for use in the vehicle 102 of FIG. 1 is depicted in FIG. 2. The example client device 200 shown in FIG. 2 is a wireless-enabled tablet device 200, positioned on the rear of a seat headrest within the rideshare vehicle 102. The client device 200 shown is positioned to be interacted with and viewed by a rideshare user sitting in a rear passenger seat of the rideshare vehicle 102 during a journey. As described in relation to FIG. 1, the client device 200 is configured to receive and output main content and supplemental content to the user following receipt from an edge server of a sequence of edge servers while the client device 200 is located in a corresponding local wireless range of the edge server. In the present example, the rideshare vehicle 102 may further comprise an additional rideshare device, configured to be operated by a driver of the rideshare vehicle 102 and further configured to communicate journey data to the client device 200 during the journey, the journey data configured to be used to determine the content or supplemental content delivered to the client device 200 as described in relation to FIG. 1. The client device 200 may be configured to access or to receive data associated with the user, for example by way of the rideshare device or from a rideshare server associated with the rideshare device or service. For example the rideshare device or the rideshare server may store and manage a plurality of user profiles of users of the rideshare service, and user data associated with the user profiles may characterize any suitable user activity or user behavior. The user data may therefore be used by the client device to customize the main content or the supplemental content output thereby in accordance with the user data.

Referring to FIG. 3 a flow chart depicting steps of an example method 300 of delivering content to a client device is shown in accordance with the present disclosure. The method comprises: at 302, determining, for example using any suitable control circuitry, journey data associated with a client device, the journey data indicating a path to be travelled by the client device; at 304, identifying, for example using any suitable control circuitry, based on the journey data, a plurality of edge servers configured to communicate content to the client device wirelessly while the client device travels along the path and is located within a corresponding local range of each edge server; at 306, determining, for example using any suitable control circuitry, based on the journey data, an upcoming movement of the client device into a local range of a first edge server of the plurality of edge servers along the path; at 308, determining, for example using any suitable control circuitry, content to be delivered to the client device, the content associated with the local range of the first edge server; at 310, causing, for example using any suitable control circuitry, storage of the determined content at a second edge server, the second edge server being earlier than the first edge server along the path; and at 312, communicating or delivering, by the second edge server, the content to the client device while the client device is located within a local range of the second edge server. The method 300 may be performed in any suitable manner as described herein, and may be performed, for example, by a system 100 such that as that described in relation to FIG. 1.

Figure 4:
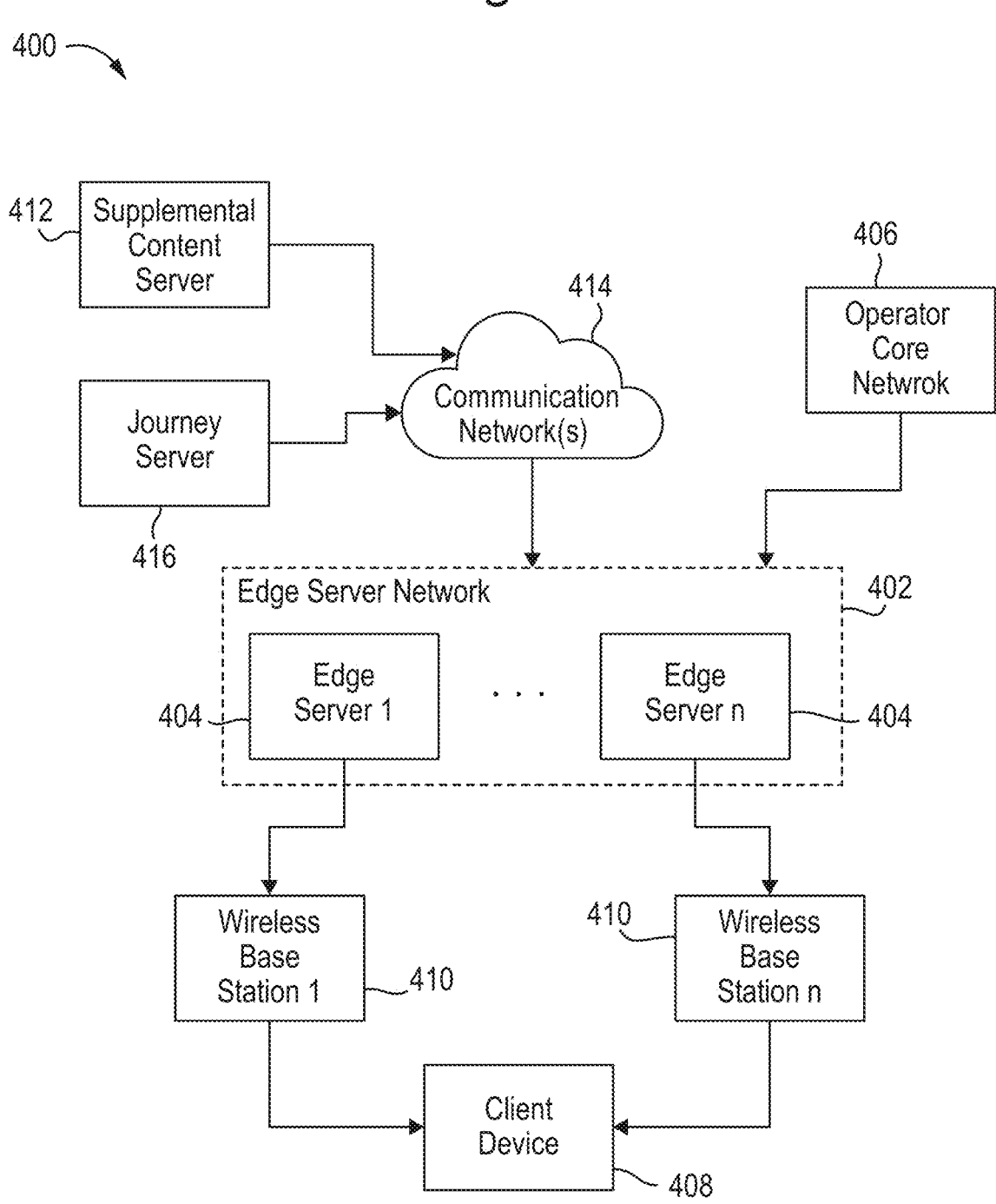
FIG. 4 depicts a block diagram of an example system for delivering content to a mobile client device, in accordance with the present disclosure.

FIG. 4 depicts a block diagram of an example system 400 for delivering content to a mobile client device, in accordance with the present disclosure, and suitable for use as a system 100 of the example of FIG. 1, and for use in the method 300 of FIG. 3.

In particular, the system 400 comprises an edge server network 402 comprising a plurality of edge servers 404, the network 402 managed by an operator core network 406. The edge servers 404 of the edge server network 402 are configured to communicate any suitable content, such as multicast stream content (which may be multicast ABR stream content as discussed in relation to FIG. 1) and supplemental content, to a client device 408 by way of a corresponding wireless base station 410. Each wireless base station 410 of an edge server 404 comprises a corresponding local wireless range within which the wireless base station 410 is configured to communicate the content, from the corresponding edge server 404, to wireless devices over any suitable wireless communication protocol. The edge servers 404 within the edge server network 402 are configured to communicate with a supplemental content server 412, by way of a communication network (such as the internet) to receive supplemental content for local storage at a memory thereof. This local caching of supplemental content at an edge server may, for example, act to reduce or minimize latency of communication of the supplemental content to a client device 408 within the associated local range of the corresponding wireless base station 410. In the particular example 400 shown, the supplemental content stored at each edge server 404 comprises an association with one or more locations within the wireless local range of the associated wireless base station 410. Such hyper-local storage and association of supplemental content for communication to a client device 408 may help to maximize or improve relevance and may minimize or reduce unnecessary transmission of irrelevant content. The edge server network 402 and the client device 408 are configured to communicate with a journey server to receive and manage journey data associated with the client device 408, the journey data indicating a path to be travelled by the client device 408. The edge servers 404 within the edge server network 402 are configured to perform a supplemental content hand-over to another edge server 404 within the network 402. As described in relation to FIG. 1 and FIG. 3, it may be determined based on the journey data, that a client device 408 will move into a local range of a wireless base station 410 during a journey. Such a supplemental content hand-over may be performed by the edge servers 404 such that an edge server 404 earlier on in the path is configured to receive supplemental content associated with the local range of said base station 410, for local storage at the edge server 404. Said edge sever 404 may thereby communicate the locally-stored supplemental content to the client device 408 when the client device 408 is in the local range of a base station 410 of the edge server 404 earlier on in the path. Such supplemental content may, for example comprise alerts, notifications or ads associated with the local range of the later wireless base station 410, such that when the client device 408 arrives at the local range of the later wireless base station 410, the client device or a user thereof may, for example, help to maximize or improve efficiency of mobile communication.

Figure 5:
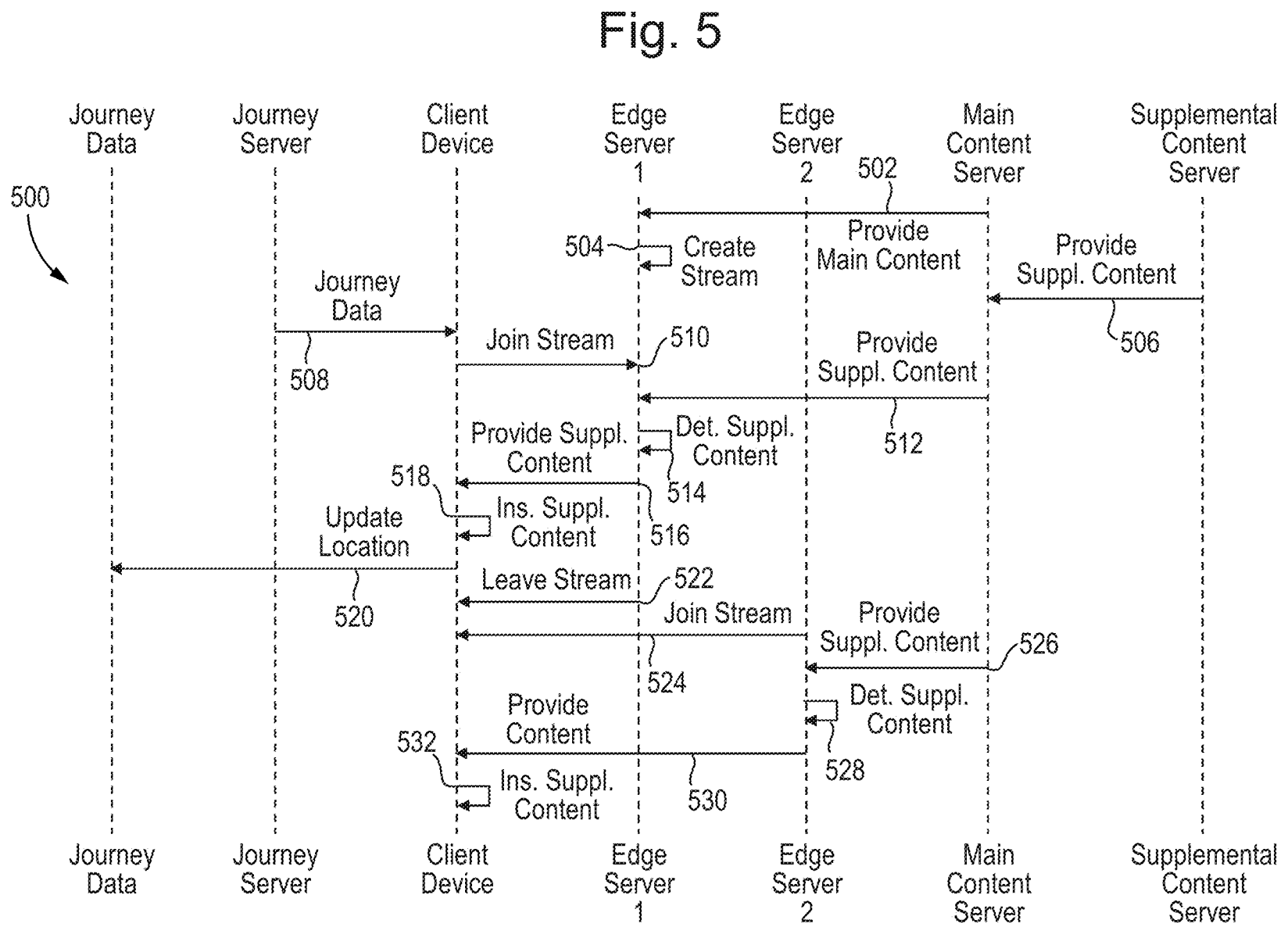

FIG. 5 depicts a sequence diagram outlining an example process 500 of communicating main content and supplemental content to a client device by way of a plurality of edge servers. The example process 500 begins at 502 with the communication of main content, such as FAST channel content for example, from a main content server to an edge server. At 504 the edge server, based on the receipt, generates a content stream, for example a multicast ABR content stream of the FAST channel content for communication to a multicast group of client devices within a local wireless range of the edge server. Such stream generation may, for example, be initiated by multiple edge servers following receipt thereby of the main content. The main content server may access supplemental content at 506 by way of a supplemental content server. At 508, the client device, having a journey application executed thereon, accesses journey data associated with an intended journey of the client device. In the example shown the journey data indicates a path to be travelled by the client device. The journey data may additionally comprise any suitable journey data, which may be accessible from the journey server, such as for example, journey duration data, journey distance data, movement speed data, traffic data, obstruction data, diversion data, and weather data among others discussed herein.

Based on the path to be travelled by the client device, a FAST channel content application executed thereon (which may be associated with or comprise the journey application), determines a sequence of edge servers of a plurality of edges servers, the sequence of edge servers having local wireless ranges incorporating positions along the path. A client device located within the local wireless range of the edge server having a generated stream, joins the generated stream at 510. At 512, the main content server may communicate the supplemental content to the current edge server for storage thereon. The client device, for example the FAST channel content application, may determine based on the journey data (for example the path) an upcoming movement of the client device into a local range of an edge server of the plurality of edge servers further along the path than the current edge server communicating the stream, for example proximate a journey destination or a destination location of the path. At 514, the current edge server may perform a determination of the supplemental content stored thereon based on the upcoming movement, and in particular based on an association of the supplemental content with the local wireless range of the edge server further along the path than the current edge server. In some examples, the determination of the supplemental content may comprise a determination of one or more supplemental content markers positioned in the main content as discussed herein, for use with any suitable form of main content such as AVOD content. At 516, the current edge server may then communicate the determined supplemental content to the client device. At 518, the supplemental content received at the client device may then undergo a client-side supplemental content insertion process, which may comprise a further determination or screening of the supplemental content by the client device, for example based on client device data or client device user data.

At 520, the client device may, during the journey, determine an upcoming movement out of the local wireless range of the current edge server into the local wireless range of the next edge server in the sequence of edge servers along the path. At 522, the edge server may accordingly, based on the determination, cause the client device to leave the current content stream. At 524, the next edge server in the sequence may, upon determining a movement of the client device into the local wireless range thereof, cause the client device to join the main content stream, such as multicast group of a multicast ABR stream of the FAST channel content described. At 526, the main content server may communicate the supplemental content to the next edge server which may, at 528, perform the same determination of the supplemental content to that performed by the previous edge server, for example based on the journey data and a determined upcoming movement of the client device into a local range of an edge server downstream along the path relative to said edge server. At 530, the edge server may then communicate the supplemental content to the client device for performing a client-side supplemental content insertion at 532, as previously described.

Examples will be appreciated wherein the sequence 500 of process steps of FIG. 5 is performed in any suitable order.

Figure 6A:
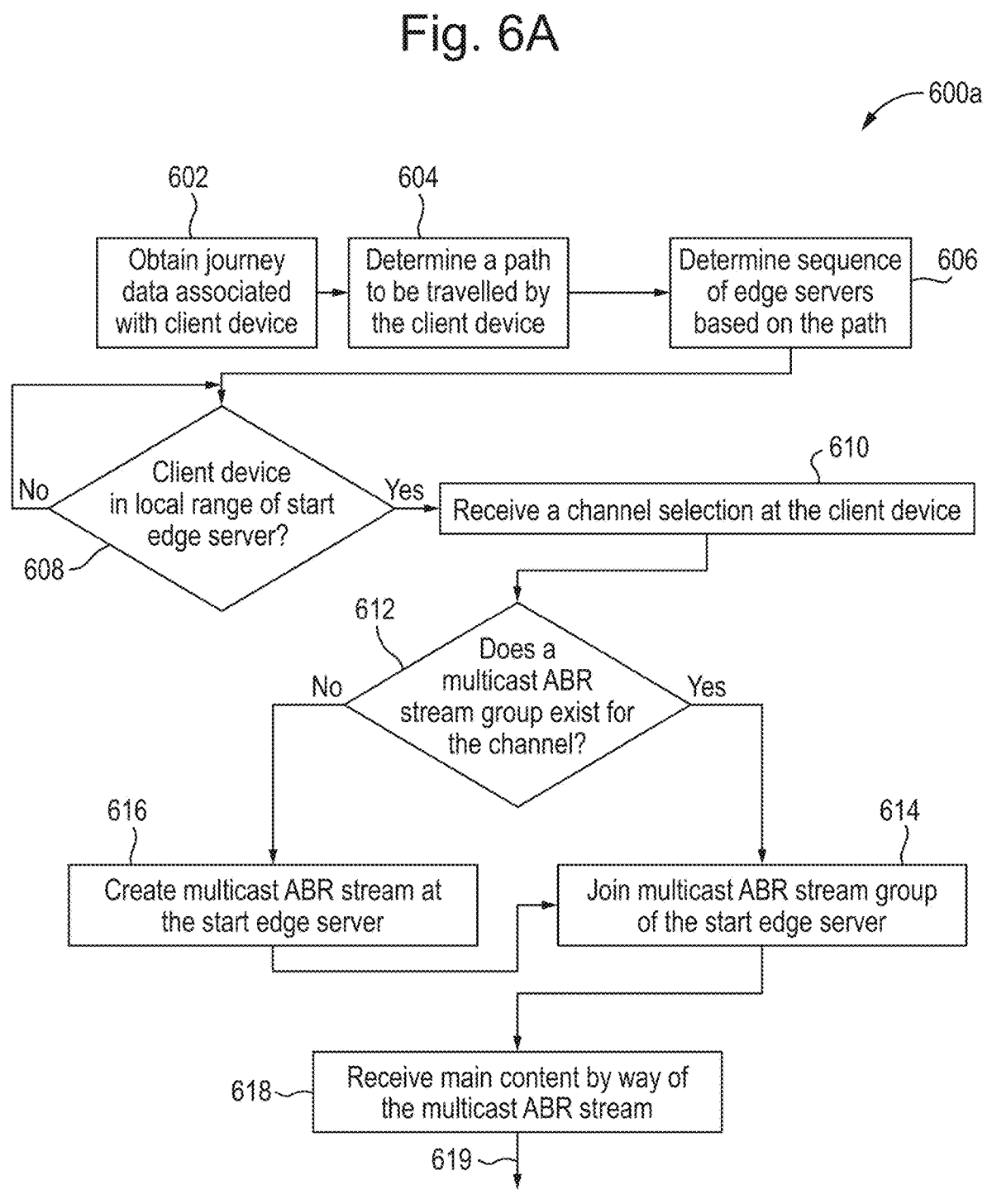
Figure 6C:
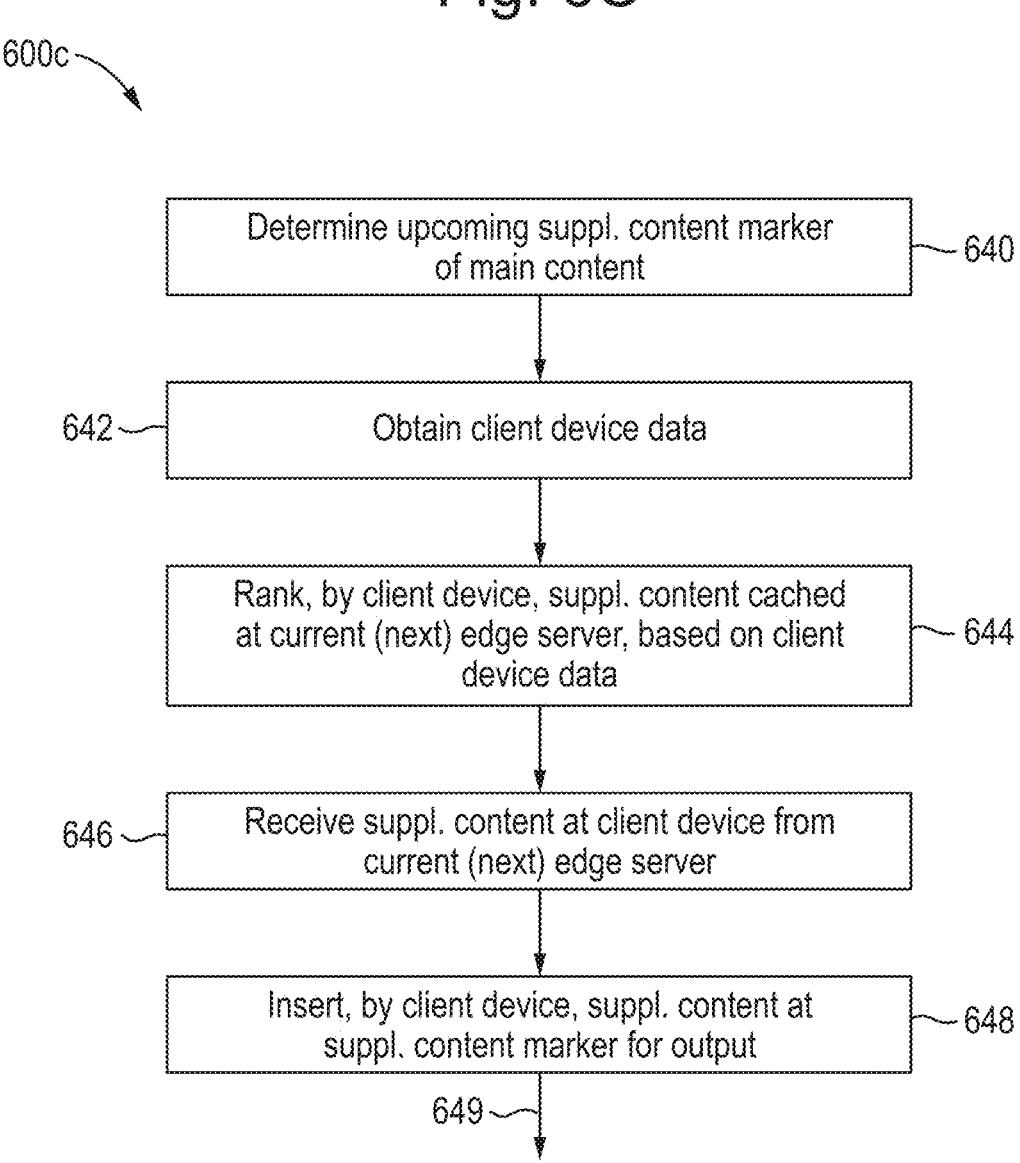

FIG. 6A to FIG. 6D depicts steps of a further example method 600a, 600b, 600c, 600d of delivering content to a mobile client device in accordance with the present disclosure. An initial portion 600a of the method is depicted in FIG. 6A and comprises, at 602, obtaining journey data associated with a client device. The journey data may be obtained by any suitable method, for example by way of a journey application executed on the client device, or by way of a journey server. The method portion 600a further comprises, at 604, determining a path to be travelled by the client device, for example based on the journey data. In some examples the journey data indicates or comprises the path to be travelled. The path to be travelled may, for example indicate a sequence of locations to be visited by the client device. The method portion 600a further comprises, at 606, determining a sequence of edge servers of a plurality of edge servers based on the path. As described herein, each edge server of the sequence of edge servers is configured to communicate content to a client device while the client device is within a local wireless range of the edge server. The method portion 600a further comprises, at 608, determining whether the client device is located within a local wireless range of a start edge server of the plurality of edge servers, and if not, continuing the determining, at 608, until the client device is determined to be within a local range of the start edge server. If the client device is located within the local range of the start edge server, the method portion 600a comprises, at 610, receiving a channel selection at the client device. The channel selection may, for example comprise receiving an interaction at the client device of an interactive user interface associated with a main content application of the client device. The main content application may for example be a FAST channel or AVOD application. In examples wherein the application is an AVOD application, the channel selection may be a selection of on demand content. In the example method portion 600a shown, following receipt of the content (for example, channel) selection, at 612 a determination is made of whether a content stream exists for selected content at the start edge server, for example a multicast ABR stream group for the selected channel or content. If such a group exists, at 614 the client device joins the stream group of the start edge server, whereas if such a stream does not exist, at 616 the start edge server is caused to start the multicast group of the stream, for example the multicast ABR stream, and the client device subsequently joins the stream group, at 614. For example, a high bitrate version of the content may be transcoded to generate a bitrate ladder, enabling ABR streaming of the content. The initial method portion 600a further comprises receiving, at the client device, the main content, such as the FAST channel or AVOD content, by way of the multicast ABR stream.

Examples will be appreciated wherein the steps of the example method portion 600a described for FIG. 6A may be performed in any suitable order.

Referring to FIG. 6B, a further portion 600b of an example method of delivering content to a mobile client device is depicted. The steps of the further portion 600b may follow after any suitable part of the initial method portion 600a, for example at 619. The method portion 600b comprises, at 620, determining a destination edge server of the sequence of edge servers, for example based on the journey data. The destination edge server may, for example, be an edge server having a local wireless range incorporating a destination location of the path. It will be appreciated that the destination edge server may in some examples be an initial destination edge server, and may for example represent an initial destination location along the path, which may be any location along the path after the local range of the start edge server.

The method portion 600b further comprises, at 622, ranking supplemental content stored or cached at the destination edge server. Edge servers in the sequence of edge servers may comprise stored thereon one or more supplemental content associated with the local wireless range of the corresponding edge server, for example a physical or virtual location within the local wireless range. The physical or virtual location may, for example, be associated with an entity or establishment associated with the supplemental content. For example the supplemental content may be an alert, a notification or an ad associated with an entity or establishment located (either physically or virtually) at the location associated with the supplemental content. The ranking, at 622, of the supplemental content cached at the destination server may be by any suitable ranking method such as discussed herein. The method portion 600b further comprises, at 624, determining a next edge server in the sequence of edge servers into which the client device is predicted to move, the next edge server positioned between the start edge server and the destination edge server. The determination of the next edge server may, for example, be based on the path and the current location of the client device along the path. The method portion 600b further comprises, at 626, receiving the determined supplemental content of the destination edge server for caching at the determined next edge server, for example by way of the destination edge server. A supplemental content hand-over is therefore performed, wherein supplemental content determined, for example to be most relevant to the destination location of the path, is communication to the determined next edge server for storage. In some examples, the client device may not yet be located within the local range of the determined next edge server, and in such examples, this pre-caching of the determined supplemental content may aid in reducing latency in the communication of the content to the client device. A determination, at 628, is then made of whether the client device is located within the local wireless range of the determined next edge server. If not, the determination at 628 continues until the client device is located within the local range of the next edge server, after which the client device is caused, at 630, to leave the stream of the start edge server, for example the multicast ABR stream group of the start edge server. A determination is made, at 632, on whether a stream exists at the next edge server for the main content, for example the FAST channel content or the AVOD content, which was communicated to the client device from the start edge server. If the stream exists, at 634 the client device is caused to join the corresponding stream group, such as the multicast ABR stream group, of the next edge server. If the stream does not exist, at 636 the next edge server may be caused to create the multicast group of the stream and the client device is subsequently caused, at 634, to join the corresponding stream group, and the client device thereby receives, at 638, the main content by way of the steam, which may be a newly-created stream, from the next edge server. For example, a high bitrate version of the content may be transcoded to generate a bitrate ladder, enabling ABR streaming of the content.

Examples will be appreciated wherein the steps of the example method portion 600*b* described for FIG. 6B may be performed in any suitable order.

Referring to FIG. 6C, a further portion 600*c* of an example method of delivering content to a mobile client device is depicted. The steps of the further portion 600*c* may follow after any suitable part of the second method portion 600*b*, for example at 639. The method portion 600*c* comprises, at 640, determining an upcoming supplemental content marker with the main content delivered to the client device. Such a determination may, for example, be performed by the current edge server (previously referred to as the "next" edge server), or may be performed by the client device, for example a main content application executed on the client device. The determination of the supplemental content marker may be by any suitable method and may, for example, include an insertion of one or more supplemental content markers in the main content.

The method portion 600*c* further comprises, at 642, obtaining, for example by way of a main content application of the client device, client device data. The client device data may be any data suitable for use in determining or ranking a suitability of the supplemental content cached at the current edge server, and may for example include current or historic journey data, or client device user data, such as activity or behavior data. The client device data may include, in some such examples, one or more determined patterns or models of the client device user data. The method portion 600*c* further comprises, at 644, ranking, by the client device, the supplemental content cached at the current edge server based on the client device data. The ranking may be performed in accordance with any suitable ranking, screening or determination method such as described herein. Such client-side determination of the supplemental content may provide additional options for customization and personalization of content provision which may reduce the amount of unnecessary communication of content to the client device.

The method portion 600*c* further comprises, at 646, receiving the ranked or determined supplemental content at the client device from the current edge server, by way of the storage of the current edge server. The communication of pre-cached content in this manner may reduce latency associated with the content provision. Following receipt of the supplemental content at the client device, the method portion 600*c* further comprises, at 648, inserting, by the client device, the supplemental content to the main content at the determined supplemental content marker for output by the client device. Client-side supplemental content insertion can permit more dynamic and tailored content provision which is more adapted to the current status or location of the client device during the journey. For example, the determination, at 644, of the supplemental content by the client device may be informed by an estimated journey time remaining or an estimated journey distance remaining in combination with an estimated movement speed of the client device. The received supplemental content may therefore be determined to suitable for receipt in the remaining journey time. The determining, at 640, of the upcoming supplemental content marker of the main content may comprise modification or insertion of one or more supplemental content markers, which may be informed by the journey data such as the estimated journey time remaining or an estimated journey distance remaining in combination with an estimated movement speed of the client device. The determination of the supplemental content markers may therefore determine a frequency of supplemental content provision according to the remaining journey time.

Examples will be appreciated wherein the steps of the example method portion 600*c* described for FIG. 6C may be performed in any suitable order.

Figure 6D:
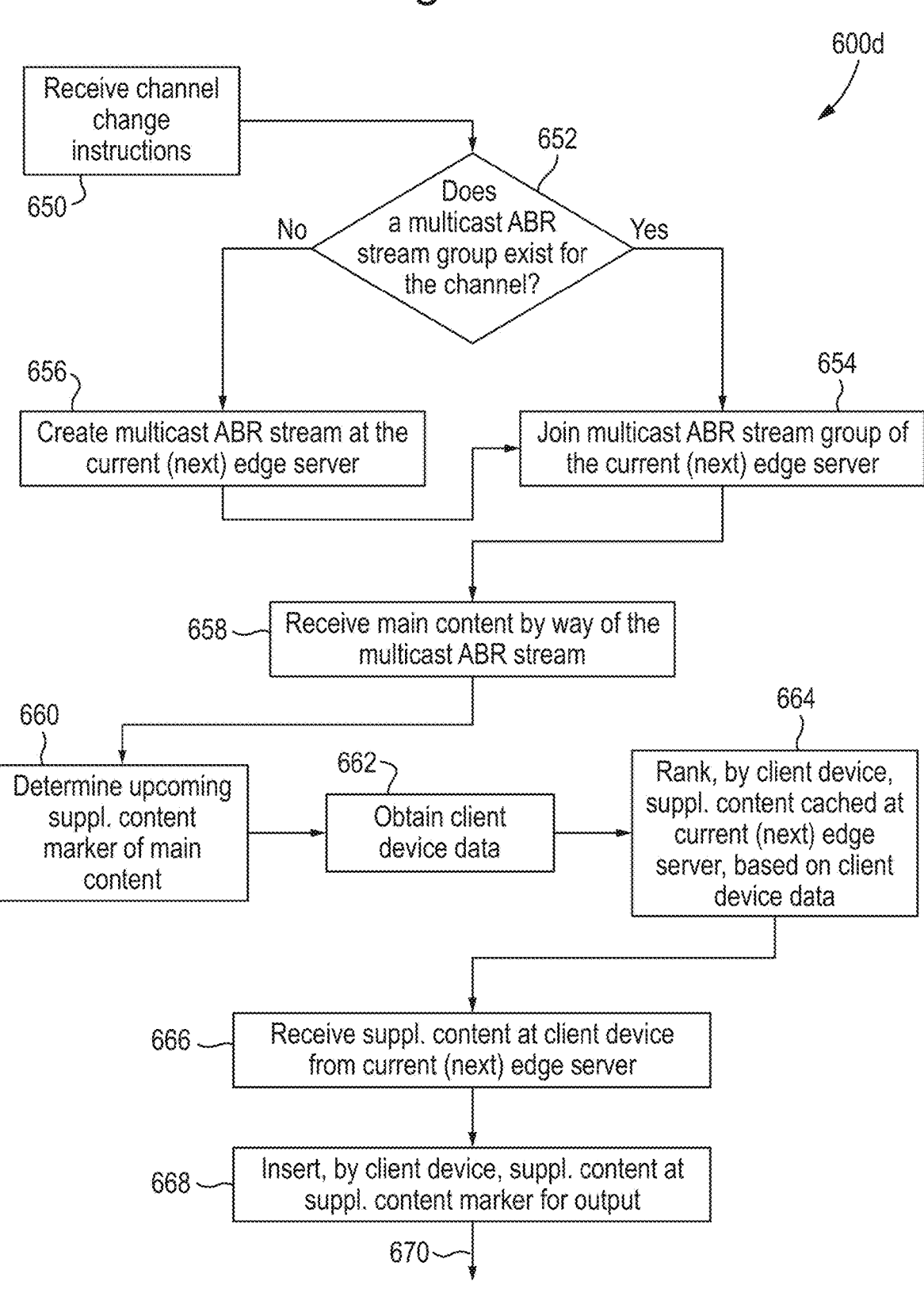

Referring to FIG. 6D, a further portion 600*d* of steps of an example method of delivering content to a mobile client device is depicted. The steps of the further portion 600*d* may follow after any suitable part of the first, second or third method portions 600*a*, 600*b*, 600*c*, for example at 619, 639 or 649. The method portion 600*d* comprises, at 650, receiving channel change instructions, for example following an interaction with the client device, such as with an interactive user interface of a main content application executed on the client device. The channel change instructions may be communicated from the client device to the current edge server. The method portion 600*d* further comprises, at 652, a determination of whether a stream exists at the current edge server for the selected channel of the main content, for example the FAST channel content or the AVOD content. If the stream exists, at 654 the client device is caused to join the corresponding stream group, such as the multicast ABR stream group, of the current edge server. If the stream does not exist, at 656 the current edge server is caused to create the stream and the client device is subsequently caused to join the corresponding stream group at 654, and the client device thereby receives, at 658, the main content by way of the stream, which may be a newly-created stream, from the current edge server.

The method portion 600*d* further comprises, at 660, a step for determining an upcoming supplemental content marker of the main content of the new channel in the same manner as the portion 600*c* of FIG. 6C. It will be understood that the main content of the new channel may be at a different position of the main content relative to the main content of the earlier channel, for example relative to a previous supplemental content marker. As such the new determination of the supplemental content marker of the main content of the new channel at 660, which may comprise a determination of a time since the previous supplemental content marker of the main content of the new channel, may act to reduce the unnecessary communication of supplemental content for the insertion into the main content of the new channel by the client device. The method portion 600*d* further comprises, at 662, obtaining client device data and at 664 using the client device data to rank, determine or otherwise screen the supplemental content cached at the current edge server in the same manner as the method portion 600*c* of FIG. 6C. After receiving communication of the determined supplemental content at 666, at the client device by way of the memory of the current edge server, the client device is configured, at 668, to insert the determined supplemental content into the main content of the new channel at the determined supplemental content marker for output.

Examples will be appreciated wherein the steps of the optional example method portion 600*d* described for FIG. 6D may be performed in any suitable order. At 670 the method portion 600*d* may proceed with any suitable part of a method portion 600*a*, 600*b*, 600*c*, 600*d* described previously. The method may for example continue until the client device reaches a journey destination or end point of the path.

Figure 7:
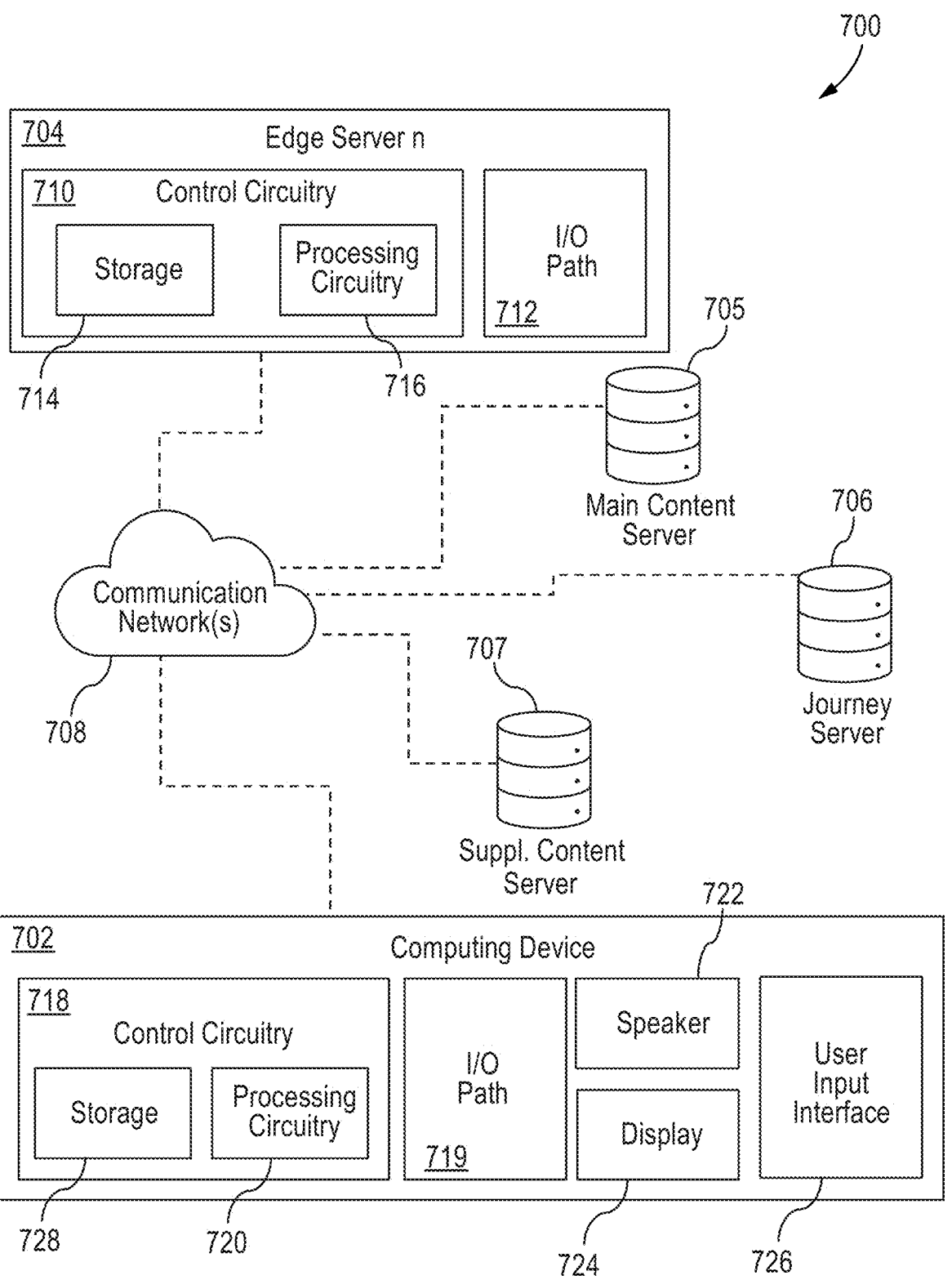
FIG. 7 is a block diagram showing components of an example system for delivering content to a mobile client device, in accordance with the present disclosure.

FIG. 7 is an illustrative block diagram showing example system 700 configured to deliver content to a mobile client device. Although FIG. 7 shows system 700 as including a number and configuration of individual components, in some examples, any number of the components of system 700 may be combined and/or integrated as one device, e.g., as client device 200. System 700 includes computing device 702 (e.g., client device 200, 408), a plurality of edge servers 704 (e.g., edge servers 110, 404), a main content server 705 (e.g., server 116), a supplemental content server 707 (e.g., server 120, 412) and a journey server 706 (e.g., server 122, 416), each of which is communicatively coupled to communication network 708 (e.g., network 114, 414), which may be the Internet or any other suitable network or group of networks. In some examples, system 700 excludes one or more of servers 704, 705, 706, 707, and functionality that would otherwise be implemented by the one or more of servers 704, 705, 706, 707 is instead implemented by other components of system 700, such as computing device 702. In still other examples, one or more of servers 704, 705, 706, 707 works in conjunction with computing device 702 to implement certain functionality described herein in a distributed or cooperative manner.

Server 704 includes control circuitry 710 and input/output (hereinafter "I/O") path 712, and control circuitry 710 includes storage 714 and processing circuitry 716, which may comprise media content processing circuitry. Computing device 702, which may be any suitable computing device such as a personal computer, a laptop computer, a tablet computer, a smartphone, a smart television, a smart speaker, an extended reality device for example comprising a HMD, or any other type of computing device, includes control circuitry 718, I/O path 719, speaker 722, display 724, and user input interface 726. Control circuitry 718 includes storage 728 and processing circuitry 720. Control circuitry 710 and/or 718 may be based on any suitable processing circuitry such as processing circuitry 716 and/or 720. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 714, storage 728, and/or storages of other components of system 700 (e.g., storages of servers 705, 706, 707, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each of storage 714, storage 728, and/or storages of other components of system 700 may be used to store various types of content, metadata, and or other types of data. Non-volatile memory may also be used (e.g., to launch a boot-up routine and other instructions). Cloud-based storage may be used to supplement storages 714, 728 or instead of storages 714, 728. In some examples, control circuitry 710 and/or 718 executes instructions for an application stored in memory (e.g., storage 714 and/or 728). Specifically, control circuitry 714 and/or 728 may be instructed by the application to perform the functions discussed herein. In some implementations, any action performed by control circuitry 714 and/or 728 may be based on instructions received from the application. For example, the application may be implemented as software or a set of executable instructions that may be stored in storage 714 and/or 728 and executed by control circuitry 714 and/or 728. In some examples, the application may be a client/server application where only a client application resides on computing device 702, and a server application resides on server 704.

The application may be implemented using any suitable architecture. For example, it may be a stand-alone application wholly implemented on computing device 702. In such an approach, instructions for the application are stored locally (e.g., in storage 728), and data for use by the application is downloaded on a periodic basis (e.g., from an out-of-band feed, from an Internet resource, or using another suitable approach). Control circuitry 718 may retrieve instructions for the application from storage 728 and process the instructions to perform the functionality described herein. Based on the processed instructions, control circuitry 718 may determine what action to perform when input is received from user input interface 726.

In client/server-based examples, control circuitry 718 may include communication circuitry suitable for communicating with an application server (e.g., server 704) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 708). In another example of a client/server-based application, control circuitry 718 runs a web browser that interprets web pages provided by a remote server (e.g., server 704). For example, the remote server may store the instructions for the application in a storage device. The remote server may process the stored instructions using circuitry (e.g., control circuitry 710) and/or generate displays. Computing device 702 may receive the displays generated by the remote server and may display the content of the displays locally via display 724. This way, the processing of the instructions is performed remotely (e.g., by server 704) while the resulting displays, such as the display windows described elsewhere herein, are provided locally on computing device 702. Computing device 702 may receive inputs from the user via input interface 726 and transmit those inputs to the remote server for processing and generating the corresponding displays.

A user may send instructions, e.g., to control the communication of content, to control circuitry 710 and/or 718 using user input interface 726. User input interface 726 may be any suitable user interface, such as a remote control, trackball, keypad, keyboard, touchscreen, touchpad, stylus input, joystick, voice recognition interface, gaming controller, or other user input interfaces. User input interface 726 may be integrated with or combined with display 724, which may be a monitor, a television, a liquid crystal display (LCD), an electronic ink display, or any other equipment suitable for displaying visual images.

Server 704 and computing device 702 may transmit and receive content and data via I/O path 712 and 719, respectively. For instance, I/O path 712 and/or I/O path 719 may include a communication port(s) configured to transmit and/or receive (for instance to and/or from content database 706), via communication network 708, content item identifiers, content metadata, natural language queries, and/or other data. Control circuitry 710, 718 may be used to send and receive commands, requests, and other suitable data using I/O paths 712, 719.

The processes described above are intended to be illustrative and not limiting. While the present examples are described in relation to a rideshare scenario, any suitable application will be envisaged, for example the client device may be a smart device or more than one smart device operating cooperatively to implement the presently disclosed functionality. For example the client device may be a combination of a smart phone and a smart watch of a user, the smart device of the user optionally comprising a journey application executed thereon specifying an intended path to be traversed by the user with the smart device.

In some examples the client device may be any suitable combination of one or more devices worn or held by the user and the client device may be moving with the user on foot. For example the client device may comprise an extended reality device such as a pair of smart glasses worn by the user, the smart glasses specifying journey data associated with an intended path of the wearer of the smart glasses. The journey data may in some examples include field of view data associated with one or more cameras or environment sensors associated with the smart glasses. In examples wherein the client device comprises such smart glasses operating in cooperation with another device such as a smart phone, the field of view data may be communicated to the smart phone from the smart glasses. In some examples the path of the journey data may be inferred at least partly based on the field of view data. For example it may be determined based on the wearer's gaze direction that the wearer intends to move to a location in the distance, such field of view and gaze data being used to predict a path of the client device used to determine the plurality of edge servers. The smart glasses may be configured to provide content to the wearer from the edge servers, for example by way of a display member located thereon. In such examples the field of view data may be used by the smart glasses to modify or perform a suitable manner of client side supplemental content insertion, for example using any suitable method described herein.

One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

The disclosure may be further understood with reference to the following. The disclosure may provide benefits including improved efficiency and improved latency for, for example, ride sharing or robo-taxi services, as well as offer personalized supplemental content, alerts, notifications, advertising or lead generation channels for locations or entities to which, or proximate to which, a user may be traveling. Users may benefit from alerts (such as safety alerts), notifications, news, updates and offers associated with locations or entities at or proximate their journey destination.

In general, this disclosure may be understood as including a journey experience or service wherein the service may have knowledge of the start location and destination location of the journey and the path in between. Additionally, parameters such as real-time location and time or distance left to destination may be known. Such information may be provided by way of an API of, for example, a journey management system, to a content service, such as video content service. Such information linkage between a mapping application, for example by way of an API, may achieve the same effect and in some implementations, the present disclosure may be used by obtaining destination information from a mapping application, such as but not limited to, "Google Maps"™, "Apple Maps"™, among others. While the present disclosure may refer in parts to FAST channel content, the present disclosure should be understood as being suitable for any type of media content, including but not limited to, AVOD services as discussed. While some examples of the disclosure discuss the use of separate media content and journey applications, it will be understood that media functions (such as for delivering FAST channel or AVOD services) may be incorporated or embedded directly into a journey application, or vice versa.

In many cases wherein a client device implemented in systems and methods of the present disclosure are engaged within a moving vehicle, it will be appreciated that different such vehicles may have different locations and different speeds. For supplemental content insertion to media content (such as video) services that are active on client devices within such vehicles, such insertion should preferably be performed with minimal latency, where consequential effects of buffering time may affect the service provided. Client devices in vehicles which are in motion may use cellular connections to reach the media content (such as FAST or AVOD) services. Depending on the load on cellular base stations, bandwidth, latency and jitter offered to such services may be constrained and variable. The present solution in some examples aims to address these challenges.

One step to be performed in the present systems and methods may be to set-up a content stream, such as a multicast ABR stream, for content or channels offered by content (such as FAST or AVOD) services. These streams, for example multicast streams, may be hosted at edge servers, for example mobile edge computing (MEC) devices at specific locations. The edge servers (such as MEC devices) may geographically distributed. Such edge servers (such as MEC devices) may be set-up within, such as at the bottom of, wireless base stations, for example in cabinets, or at the very edge location of a service provider network. Using the US as an example, and without wishing to be bound by theory, the majority of the population may be less than around 5 miles away from a wireless base station. As such, a mobile client device moving in a US location, for example in a vehicle during a rideshare, may be expected to be served by a specific edge server (such as an MEC device) during its journey. It will be understood within the context of the present disclosure that the term "edge server" may refer to a single server or multiple servers (for example a rack of servers), and may be operated by a service provider, such as a content service provider.

As a client device (for example in a vehicle) moves through such a location, the client device may be expected to be covered and served by an edge server (for example an MEC device) at any one time during the journey. When the client device is covered by an edge server, the media content service that is running on the device (which may be in a vehicle) may join a content stream (such as a multicast ABR stream of a FAST channel) and content may be served directly from the edge server to ensure minimum or reduced latency. This approach may also bring other benefits such as optimum channel zapping speed, by reducing the channel change time expected, which may be as a result of the proximity of the edge server to the client device.

Once a client device (for example in a vehicle) is getting close to an external boundary of an edge server coverage (a local wireless range), the client device may be informed by the edge server that an impending hand-over will be necessary, and as the client device moves into the local range of a new edge server, the new edge server will serve the client device. Once the client device migrates to the new edge server connection, the client device may be expected to leave the content stream (for example the multicast ABR group for the FAST channel) it is receiving and join the content stream (for example the multicast ABR group) that is hosted on the new edge server.

Each edge server may receive supplemental content (such as alerts, notifications or ads) related to locations and entities (such as businesses) that are present within the geographical area that the edge server serves (which may in some cases be a radius of around 3 to 5 miles). Supplemental video content may be more bandwidth heavy than other forms of supplemental content (such as audio) and as such their insertion process may be comparatively more latency sensitive. Such content may be sent to the edge server from supplemental content servers and may be cached at these edge server locations. The supplemental content may be periodically refreshed when new supplemental content becomes available or new entities (such as businesses) open within the associated local range, or decide to issue supplemental content for communication to client devices.

Each supplemental content may be assigned or tagged with a physical location (for example representing an associated business location). One example may be a restaurant advertisement wherein the associated location is the physical location of the restaurant within the local range. Another example may be personalized health appointment alerts or notifications wherein the associated location is the physical location of a hospital or health clinic within the local range. Another example may be an advertisement for a national bank, wherein a physical local branch location address is covered by the edge server local range and is associated with a corresponding supplemental content. A further example may be a virtual physical location which may be associated with the supplemental content, such as a billboard location, wherein an entity associated with the supplemental content is not physically located at the associated location. One such example may be weather safety alerts associated with a virtual physical location within a local range along the journey or path, wherein for example a weather station associated with the weather alerts is not physically located at the associated location. By way of further example, a ticket sales company may assign supplemental content for an upcoming game or concert an associated physical location of a sports field, or a concert hall.

Media content may comprise fixed, or pre-determined supplemental content insertion points or markers, often determined for example by SCTE markers or VAST headers, among others. Once such a marker is reached for a client device (such as in a vehicle), the most suitable supplemental content may be determined for insertion. As disclosed herein, there are a number of methods of determining, choosing, filtering, screening or ranking the supplemental content, including, but not limited to, the following: a supplemental content may comprise a closest associated physical proximity to the journey destination or end point of the path. Such proximity may be defined by a GPS location, but other options to achieve more granular (for example sub-meter) proximity, may comprise cellular assisted GPS, Bluetooth, or Wi-Fi Triangulation methods, which may be employed to determine a distance between the client device (for example in a vehicle), the journey destination location, and the supplemental content's associated physical location; the current location of the client device (such as in a vehicle) may be used to determine the supplemental content, for example the supplemental content having the closest associated physical location to the client device location; the associated supplemental content location may be compared with a threshold proximity of the current location of the moving client device and the journey destination location; the associated supplemental content location may be within a proximity of a client device location observed within a previous threshold period (for example the previous three to five seconds), which may provide a short past time window which may be used to determine the supplemental content; the supplemental content may be determined in accordance with a real time programmatic supplemental content bidding process (such as an ad-bidding process), during which a supplemental content buyer may place a higher bid irrespective of whether the associated location of the supplemental content subject to the bid is not observed to be the closest to the client device location or a destination location, when compared to other supplemental content which may have associated locations closer location. In place of or in addition to such bidding, any suitable ranking system may be used, such as based on a determined importance of the supplemental content, for example safety alerts or notifications.

Once the supplemental content is determined, the determined supplemental content may be sent to the client device for insertion from the edge server. An application executed on the client device (for example associated with a FAST or AVOD service) may insert the supplemental content received from the edge server at an appropriate supplemental content marker. The client device (such as applications executed thereon) may provide additional determination, filtering and selection of the supplemental content, for example based on first party data present on or associated with the client device or the client device user. For instance, a rideshare provider having user profile information of a rideshare service user, for example name, gender, previous ride history, financial information, tipping patterns, food orders, delivery history, among others. may be used to determine that one supplemental content is more suitable or targeted compared with another. Other customization or personalization options may be apparent, for example if the user is user of a particular type of rideshare service or whether they have a high or low rating in a rideshare service application.

Another feature of the disclosure may be understood as a determination of supplemental content frequency management for a particular client device or user, for example based on the journey data. For example, the destination location may be used to determine a supplemental content multiple times as the journey continues, and may increase, decrease or stay the same frequency as the client device approaches the destination location. One or more determined interest parameters of the client device user may be determined (and may also be a parameter or output of the RTB process as signaled between SSP and DSP) to achieve more exposure of a particular supplemental content to the client device. For example, a particular supplemental content may be provided more than once or in accordance with a particular determined frequency, which may be adjusted (for example increased) based on a journey time remaining or distance to the destination location.

In one implementation, a frequency may also be modified based on a current client device location, the journey destination location, and how many supplemental content markers are present for the particular content (such as a FAST channel content) being communicated. Implementations of the present disclosure may take into account channel changes that may be performed by the client device, and may cause an updating of the supplemental content markers for the new channel. Such an update may be taken into account when determining the supplemental content to the be delivered to the client device, and which supplemental content may be inserted by the client device, and may additionally take into account for example the client device location, and supplemental content bids and frequencies.

The determination of the supplemental content, or the supplemental content markers, may be adjusted based on one of any number of suitable dynamic conditions, such as traffic data (for example indicating congestion or deconges-tion), traffic accidents, road closures among other, which may impact journey time, delay-or wait-time at a particular location (for example during traffic congestion) and esti-mated time of arrival at the journey destination location. Adjustments may be made to the determination processes depending on time of day, for example if a journey is taking place when locations or entities (such as a hospital or advertising businesses) are open or closed. In such condi-tions, supplemental content which may be associated with a virtual physical location may be prioritized and communi-cated more frequently, which may depend on additional factors such as supplemental content bidding and purchase policy and client device or client device user preferences.

Once the journey destination location has been reached, this may be reported by a journey application associated with the client device, and the client device may be removed from the content stream (for example the multicast group) to which it was connected, and the client device may no longer be able to receive the content (for example to watch the FAST channels and enjoy fast channel switching as well low latency). In one implementation, the system may comprise a grace period, for example 30 minutes after a journey is completed (such as a rideshare journey) as an extensions during which the client device may continue to receive the content (such as from FAST services) and may remain connected to the content stream (for example the multicast group).

In one example, supplemental content filtering before insertion at the client device may be performed completely on the edge server-side. In one example, supplemental content inserted at the client device may comprise any suitable dynamic components, such as an interactive request, order, deal, or discount options that may for example be time-sensitive, time-limited, and additionally, or alterna-tively, location sensitive. For example, a particular supple-mental content may comprise a declaration or statement contained within a dynamic and interactive portion thereof, the declaration or statement indicating that the client device is expected to arrive at a particular location (for example based on the journey data) at a particular time (for example 2 pm) and that if the client device or the client device user associated therewith or currently signed in to the client device at or within a threshold proximity to a location, entity or establishment (such as a store) within a specified time window (for example by 2:15 pm), a particular outcome or offer may result (for example a 20% discount on purchases). In an alternate example, the dynamic or interactive portion of a supplemental content may state that arrival of the client device at a particular location is expected (for example based on the journey data), and that if the client device or the user associated with or currently signed into the client device approaches or arrives at a nearby location (for example across the street), an outcome or offer may result (for example an additional 10% discount on top of sale prices). These dynamic and interactive elements or portions of the supplemental content may be configured to vary based on, for example, the journey data, or may be personalized per client device or client device user, for example for a specific journey or journey parameters. Interactive time and location-based components of the supplemental content may for example be refreshed based on a changing of the journey data or parameters of the journey.

In one example, the determining of the content or supple-mental content, by any suitable means (which may in some examples be by way of a programmatic supplemental con-tent bidding process) may be performed entirely on the edge server, which may also hold supply-side or demand-side platforms (SSP, DSP). In one example, in order to provide more exposure for a particular supplemental content (for example based on a premium which may be paid for a supplemental content, for example an alert, notification or ad, by an entity or brand during a programmatic bidding process) based on known journey data, only most suited main content (such as FAST channels), based on their pre-computed supplemental content markers (which may for example indicate ad breaks in the main content) may be configured to receive channel change instructions from a client device. For example, in some such examples a channel determination may be performed based on the journey data or any other suitable parameter, which may determine or limit the channels or content to which the client device may switch following receipt of channel change instructions therefrom. In such examples, a dynamic content or channel selection process may be provided (such as a dynamic electronica programming guide—EPG) based on the jour-ney data or any other suitable parameters, which may help to improve or maximize the association of main content or supplemental content to the local range of the second edge server (or a location, entity or establishment therewithin).

In one example, content (such as FAST channels) hosted on a content stream by each edge device may comprise local news channels (such as associated with a local range in which the client device is located at a particular time, or that of the second edge server) automatically selected for deliv-ery to the client device, or for example positioned at the top of a list or ranking of content options to be delivered to the client device. In some examples, as the client device moves into the local range another edge server, a local TV channel or news channel may be positioned at the top of a list or ranking of content options to be delivered to the client device, for example as the recommended FAST channel within a FAST Player of the client device. In one example, if there are no client devices within a local range of an edge server which are accessing a particular content or content stream (for example as part of a multicast ABR group for a particular FAST channel), the content stream may be termi-nated. In some examples, if there are numerous client devices located within a local range of an edge server which are accessing a particular content or content stream (for example members of a multicast IP ABR FAST channel group), as the locations of such client devices get closer to a local range of a different edge server, a new content stream (for example a multicast IP ABR group for the channels from the local range of the previous edge server) may be initiated on the migrating-of the client devices to different edge server local range. Such initiation may aid pre-empting such a handover which may reduce latency in communicating the content to the client devices. In one example, all supplemental content may be communicated or delivered by the edge server to a client device (such as a FAST Player application executed thereon) and dynamic client-side supplemental content insertion (such as client-side ad insertion—CSAI) may be performed by the client device (for example the FAST Player executed thereon).

What is claimed is:

1. A method for delivering content to a mobile client device, the method comprising:

determining, using control circuitry, journey data associated with a client device, the journey data indicating a path to be travelled by the client device;

identifying, using control circuitry, based on the journey data, a plurality of edge servers, each edge server configured to communicate content to the client device as the client device travels along the path and is located within a corresponding local range of the edge server;

determining, using control circuitry, based on the journey data, an upcoming movement of the client device into a local range of a first edge server of the plurality of edge servers along the path;

determining, using control circuitry, content to be delivered to the client device, the content associated with the local range of the first edge server;

causing, using control circuitry, storage of the determined content at a second edge server of the plurality of edge servers, the second edge server being earlier than the first edge server along the path;

communicating, by the second edge server, the content to the client device while the client device is located within a local range of the second edge server.

2. The method of claim 1, wherein method further comprises determining based on the journey data, an upcoming movement of the client device into the local range of the second edge server, and wherein the causing of the second edge server to store the content is performed based on the determination.

3. The method of claim 1, wherein the determined content is received at the second edge server by way of the first edge server for storage.

4. The method of claim 1, wherein the content is supplemental content configured to be inserted, by the client device, at a supplemental content marker of a main content, wherein each of the plurality of edge servers is configured to communicate the main content to the client device while the client device travels along the path and is located within the corresponding local range of the edge server.

5. The method of claim 4, wherein the plurality of edge servers form a sequence of edge servers along the path, the method further comprising switching from the communication of the main content from an edge server in the sequence, to a communication of the main content by the next edge server in the sequence, wherein said switching is seamless.

6. The method of claim 4, wherein the communicating of the supplemental content to the client device comprises:

determining the supplemental content marker within the main content; and communicating the supplemental content for output at the supplemental content marker.

7. The method of claim 6, wherein the method further comprises:

causing inserting, by the client device, the supplemental content at the supplemental content marker.

8. The method of claim 6, wherein determining the supplemental content marker within the main content comprises:

determining a supplemental content marker position based on the journey data; and inserting the supplemental content marker within the main content at the determined supplemental content marker position.

9. The method of claim 1, wherein the method further comprises:

modifying the content based on the journey data; and wherein communicating the content to the client device comprises communicating the modified content to the client device.

10. The method of claim 1, wherein the content is determined based on one or more selected from: a context associated with a location within the local range of the first edge server, the content associated with the location; a distance between a location within the local range of the first edge server and a position along the path, the content associated with the location; client device data; client device user data; a ranking associated with the content within a plurality of content; a location of the client device along the path; the journey data; a content, a main content, or a main content channel communicated to the client device; a multicast content stream or a multicast content stream group of the client device; multicast stream group data associated with a multicast content stream group of the client device; or a detected or predicted receipt of channel change instructions from the client device.

11. A system for delivering content to a mobile client device, the system comprising:

control circuitry configured to:

determine journey data associated with a client device, the journey data indicating a path to be travelled by the client device;

identify, based on the journey data, a plurality of edge servers, each edge server configured to communicate content to the client device as the client device travels along the path and is located within a corresponding local range of the edge server;

determine, based on the journey data, an upcoming movement of the client device into a local range of a first edge server of the plurality of edge servers along the path;

determine, content to be delivered to the client device, the content associated with the local range of the first edge server;

cause storage of the determined content at a second edge server of the plurality of edge servers, the second edge server being earlier than the first edge server along the path;

communicate the content to the client device while the client device is located within a local range of the second edge server.

12. The system of claim 11, wherein control circuitry is further configured to:

determine, based on the journey data, an upcoming movement of the client device into the local range of the second edge server, and wherein the causing of the second edge server to store the content is performed based on the determination.

13. The system of claim 11, wherein the determined content is received at the second edge server by way of the first edge server for storage.

14. The system of claim 11, wherein the content is supplemental content configured to be inserted, by the client device, at a supplemental content marker of a main content, wherein each of the plurality of edge servers is configured to communicate the main content to the client device while the client device travels along the path and is located within the corresponding local range of the edge server.

15. The system of claim 14, wherein the plurality of edge servers form a sequence of edge servers along the path, the control circuitry further configured to: switch from the communication of the main content from an edge server in the sequence, to a communication of the main content by the next edge server in the sequence, wherein said switching is seamless.

16. The system of claim 14, wherein the communicating of the supplemental content to the client device comprises:

determining the supplemental content marker within the main content; and communicating the supplemental content for output at the supplemental content marker.

17. The system of claim 16, wherein the control circuitry is further configured to:

cause inserting, by the client device, the supplemental content at the supplemental content marker.

18. The system of claim 16, wherein determining the supplemental content marker within the main content comprises:

determining a supplemental content marker position based on the journey data; and inserting the supplemental content marker within the main content at the determined supplemental content marker position.

19. The system of claim 11, wherein the control circuitry is further configured to:

modify the content based on the journey data; and wherein communicating the content to the client device comprises communicating the modified content to the client device.

20. The system of claim 11, wherein the content is determined based on one or more selected from: a context associated with a location within the local range of the first edge server, the content associated with the location; a distance between a location within the local range of the first edge server and a position along the path, the content associated with the location; client device data; client device user data; a ranking associated with the content within a plurality of content; a location of the client device along the path; the journey data; a content, a main content, or a main content channel communicated to the client device; a multicast content stream or a multicast content stream group of the client device; multicast stream group data associated with a multicast content stream group of the client device; or a detected or predicted receipt of channel change instructions from the client device.

* * * * *